United States Patent [19]

Scott et al.

[11] Patent Number: 4,480,480

[45] Date of Patent: * Nov. 6, 1984

[54] SYSTEM FOR ASSESSING THE INTEGRITY OF STRUCTURAL SYSTEMS

[75] Inventors: David R. Scott, Lancaster, Calif.; Thomas S. Rhoades, Colorado Springs, Colo.

[73] Assignee: Scott Science & Technology, Inc., Lancaster, Calif.

[*] Notice: The portion of the term of this patent subsequent to Sep. 1, 1998 has been disclaimed.

[21] Appl. No.: 371,802

[22] Filed: Apr. 27, 1982

Related U.S. Application Data

[63] Continuation-in-part of Ser. No. 265,031, May 18, 1981, abandoned, and Ser. No. 371,321, Apr. 26, 1982, Pat. No. 4,409,842, each is a continuation-in-part of Ser. No. 86,772, Oct. 22, 1979, Pat. No. 4,287,511.

[51] Int. Cl.³ .............................................. G01L 1/26
[52] U.S. Cl. .......................................... 73/769; 73/786
[58] Field of Search ................ 73/763, 765, 786, 769; 364/508

[56] References Cited

U.S. PATENT DOCUMENTS

| | | | |
|---|---|---|---|
| 2,796,503 | 6/1957 | Ward | 73/765 X |
| 3,128,375 | 4/1964 | Grimnes | 364/508 |
| 3,354,703 | 11/1967 | Russell, Jr. et al. | 364/508 X |
| 3,412,961 | 11/1968 | Howard | 364/508 X |
| 3,510,696 | 5/1970 | Bargen et al. | 364/508 X |
| 3,755,658 | 8/1973 | Walters | 364/508 |

Primary Examiner—Jerry W. Myracle
Attorney, Agent, or Firm—William H. Drummond

[57] ABSTRACT

Systems and methods for assessing the effect of at least one of a plurality of forces acting upon a structure. Structural moment detectors, combined with external signal and data-processing components or structural information detectors which are unitary devices which include the signal and data-processing functions, are employed as an integral component of these systems. These systems include basic measurement systems, structural integrity measurement systems, applied structural measurement systems, applied load measurement systems, applied communication-detection systems and additional miscellaneous systems.

1 Claim, 71 Drawing Figures $R_1$ = 4990 OHM
$R_2$ = 20 OHM
$T_1 = T_2$ = 2N2222 OR EQUIVALENT
LED = LIGHT EMITTING DIODE $R_1$ = 1-10 MΩ
$R_2$ = 100-700 KΩ
PV = PHOTOVOLTAIC CELL

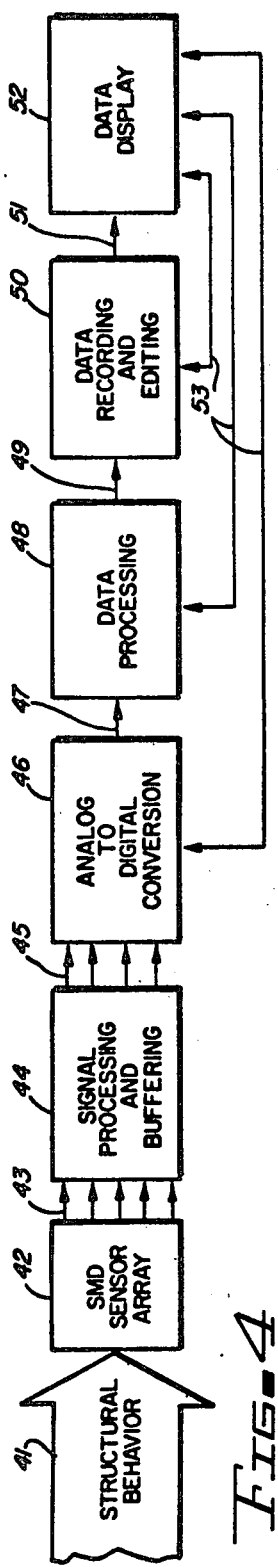
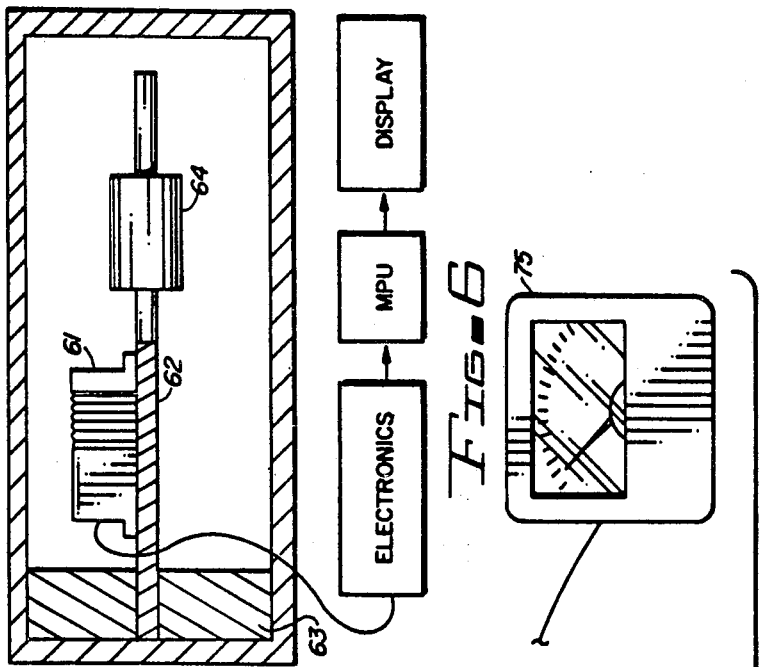
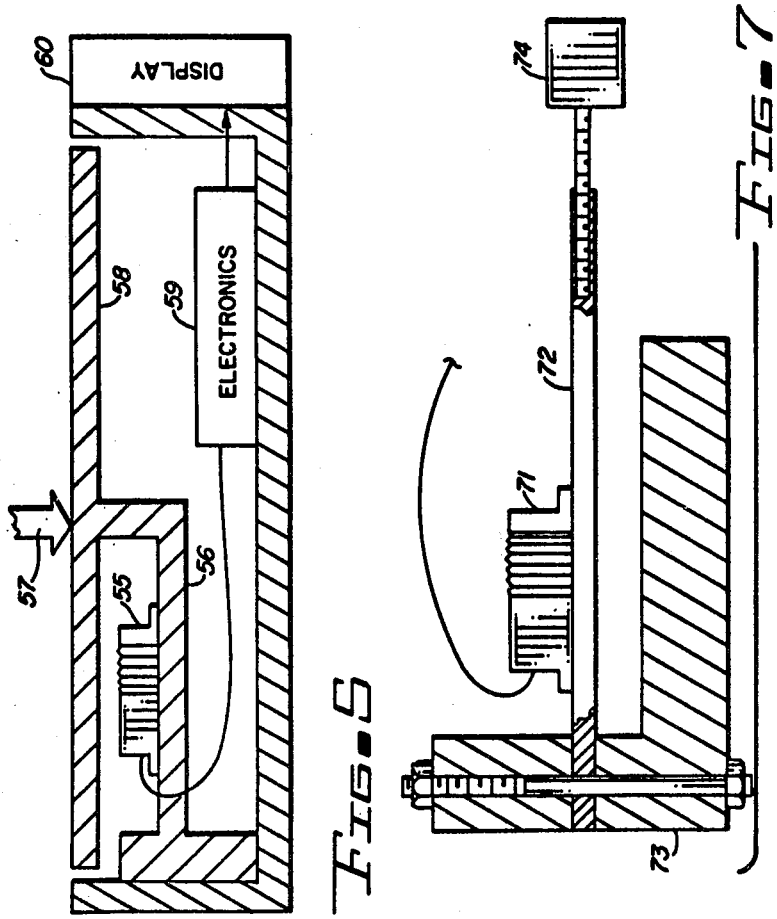

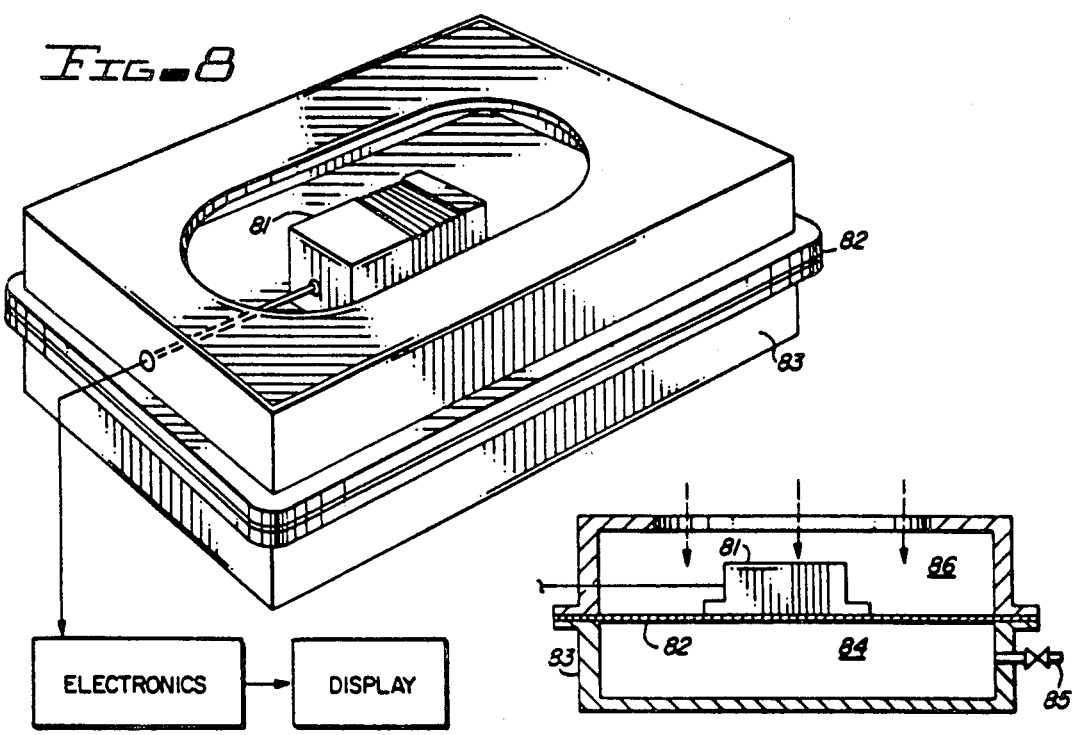
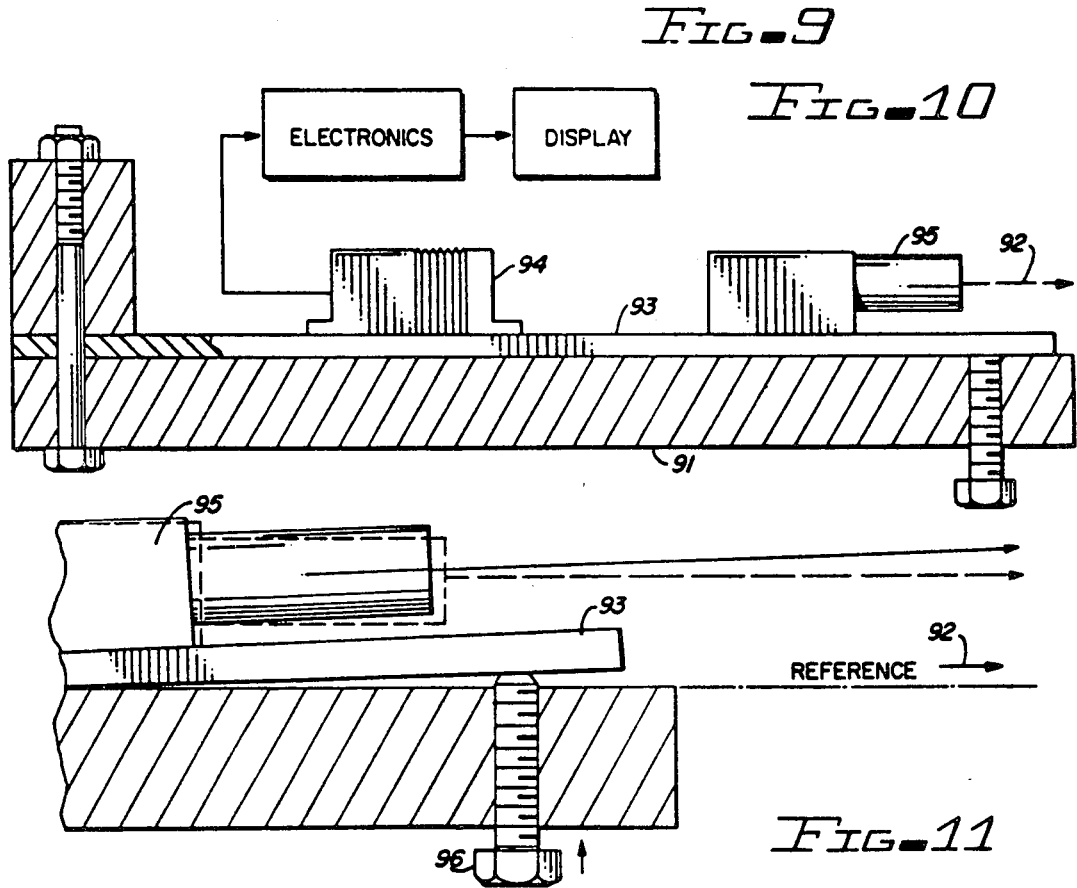

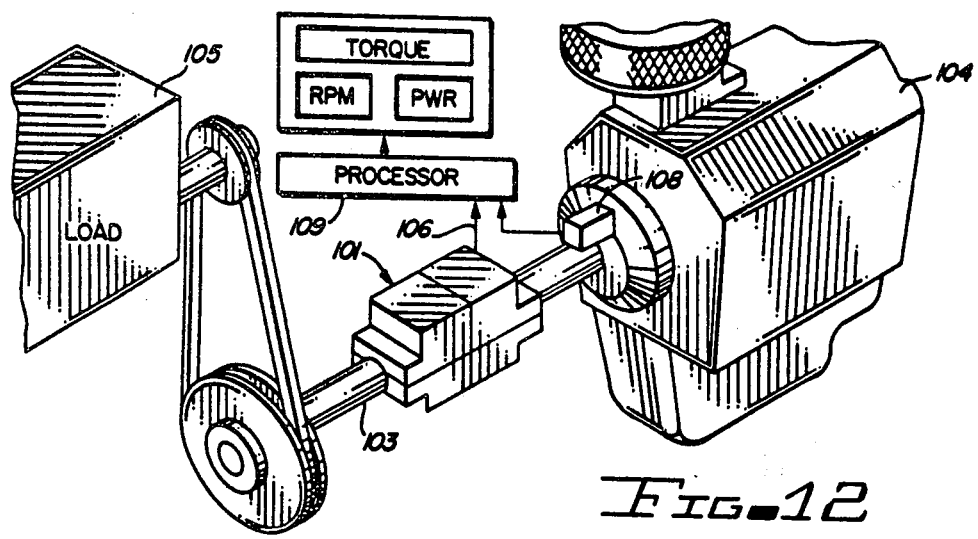
FIG.-12
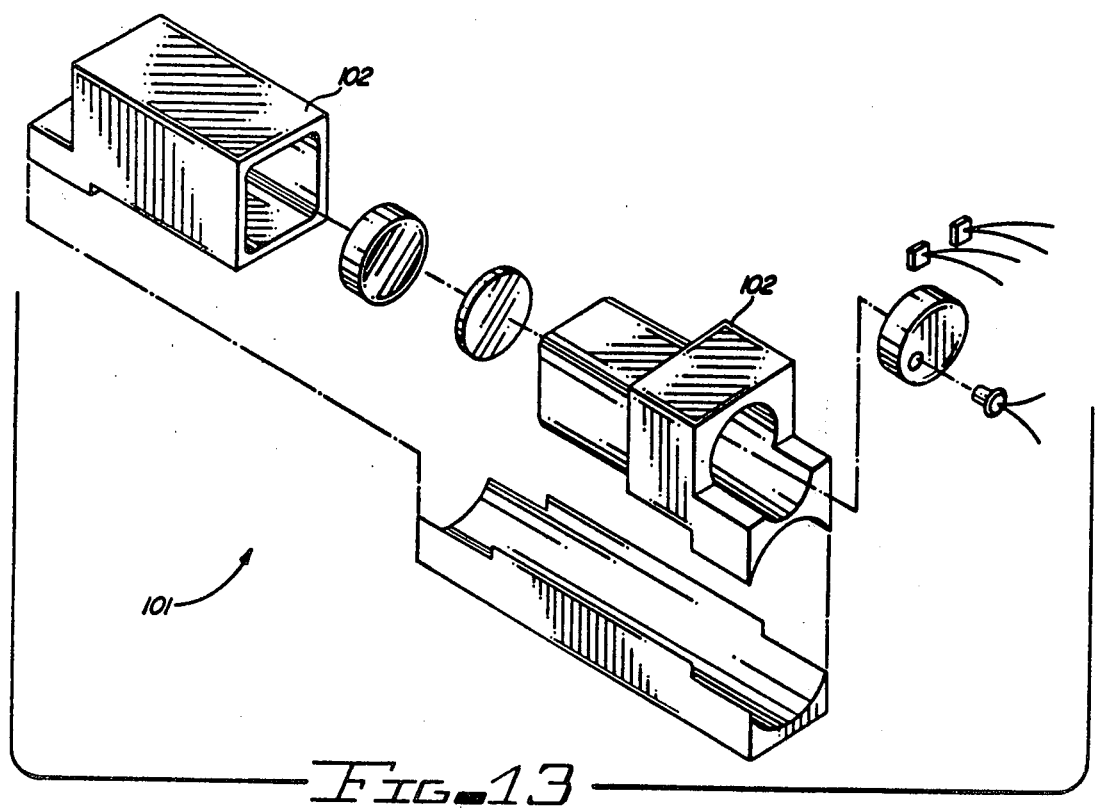
FIG.-13
FIG.-14
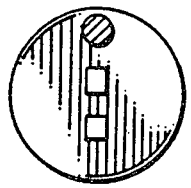
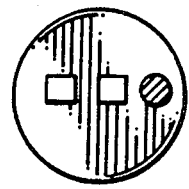
FIG.-15

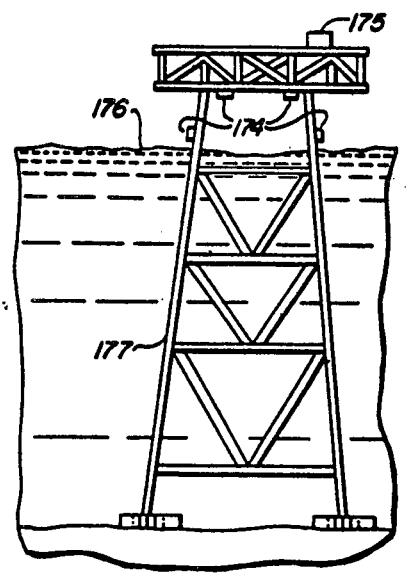
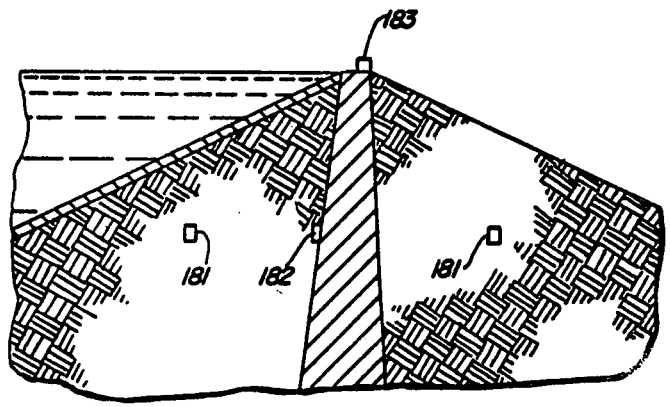
Fig. 26  Fig. 27
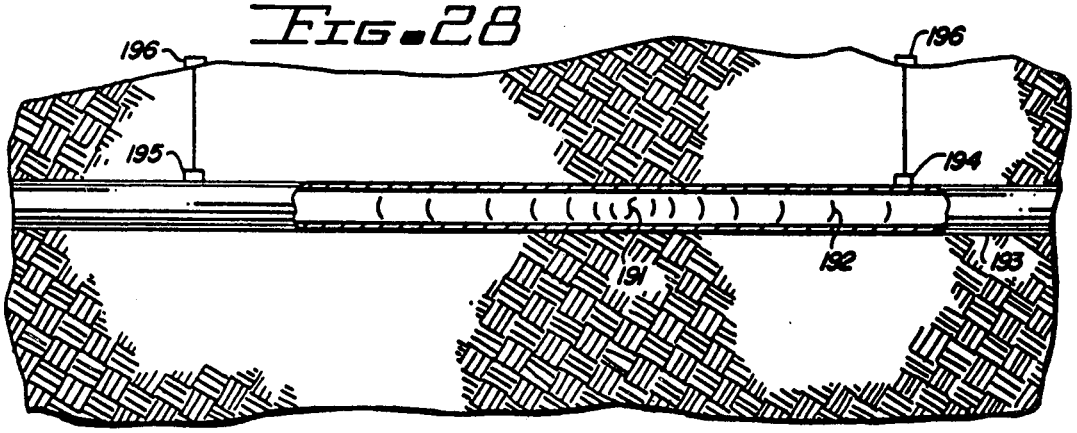
Fig. 28
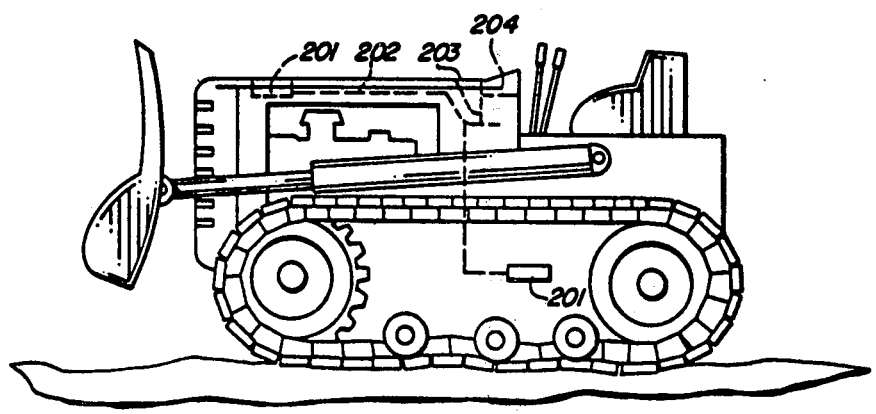
Fig. 29

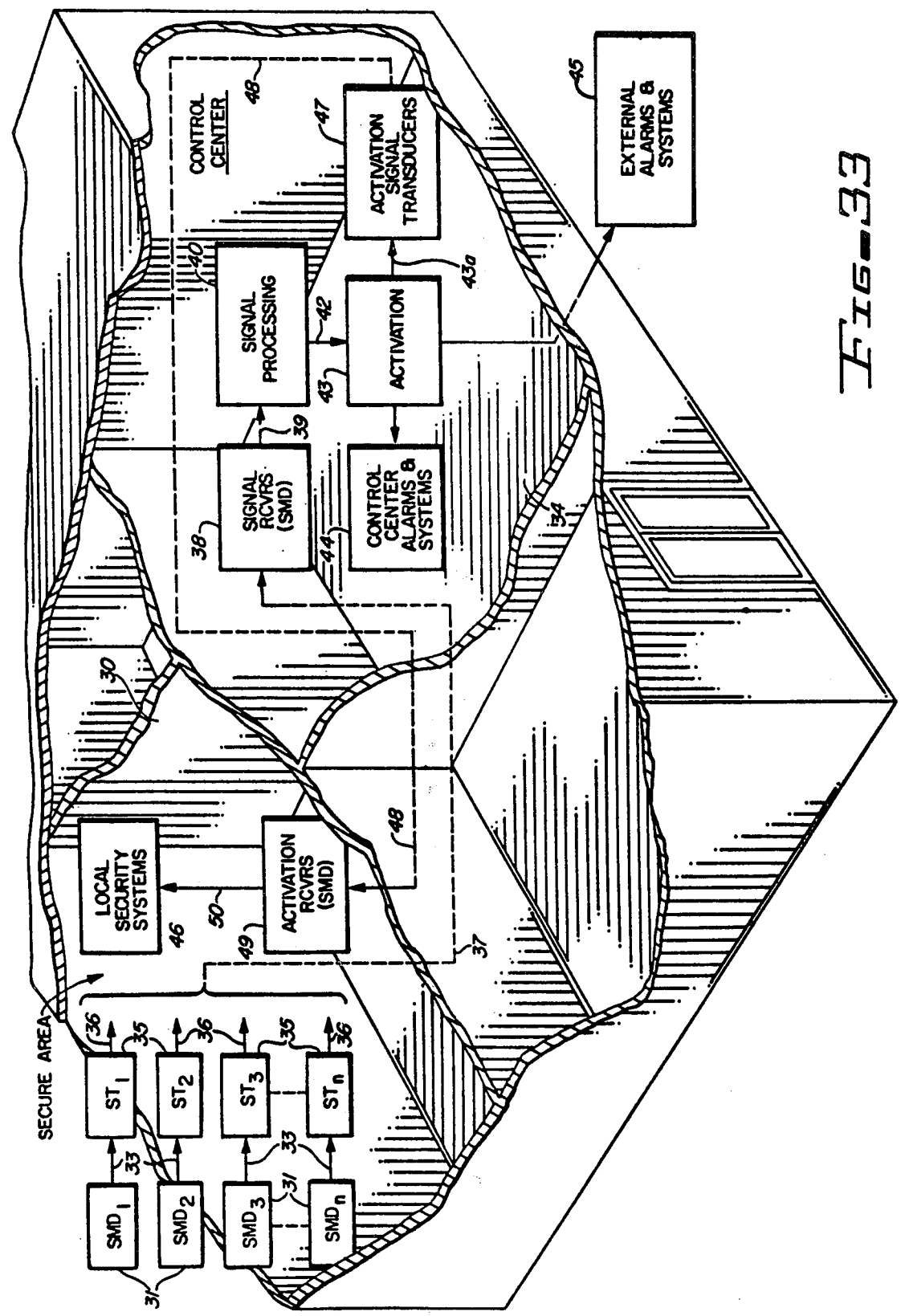

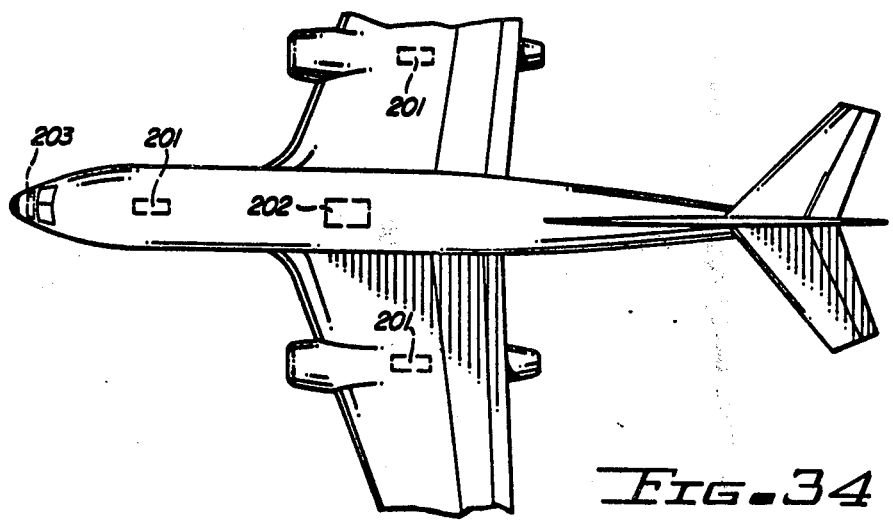
FIG. 34
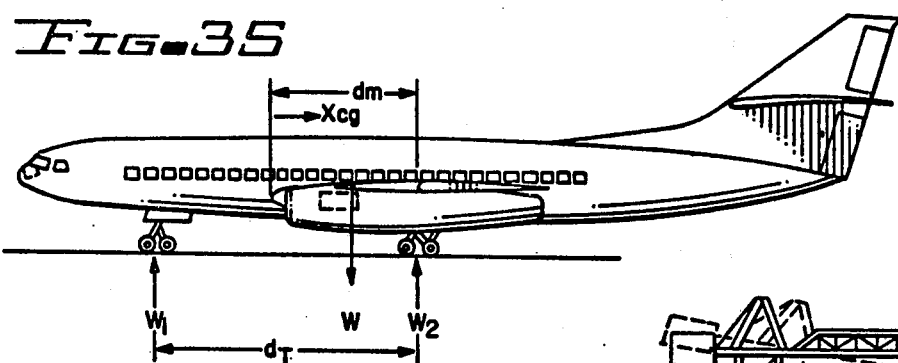
FIG. 35
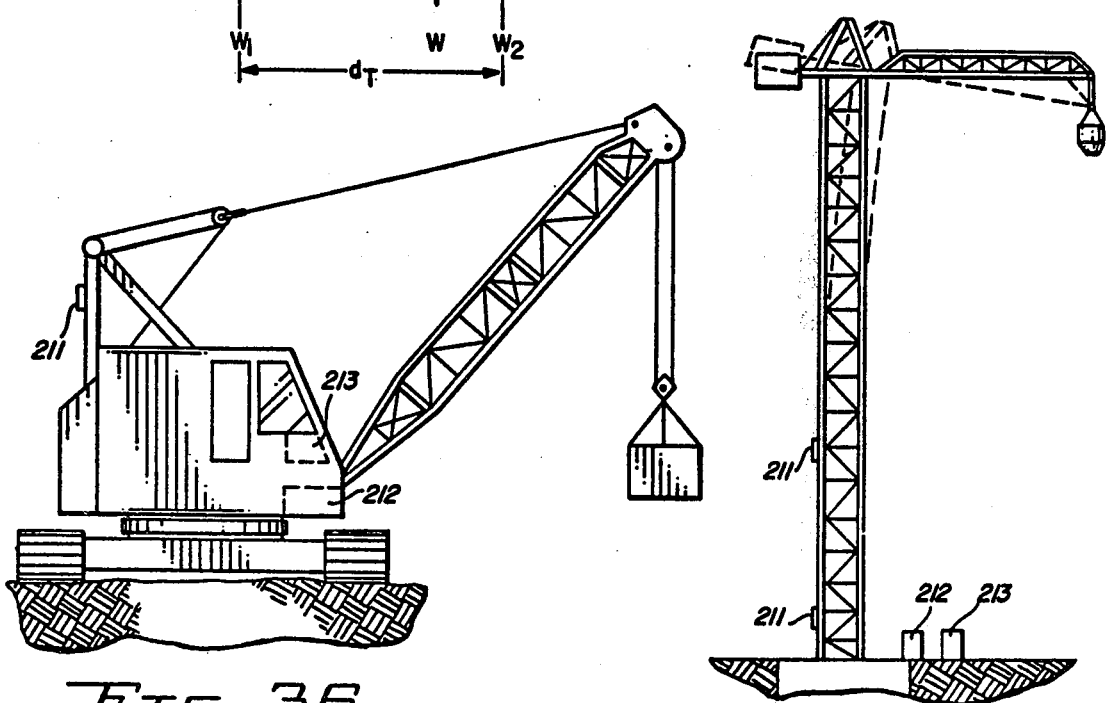
FIG. 36
FIG. 37

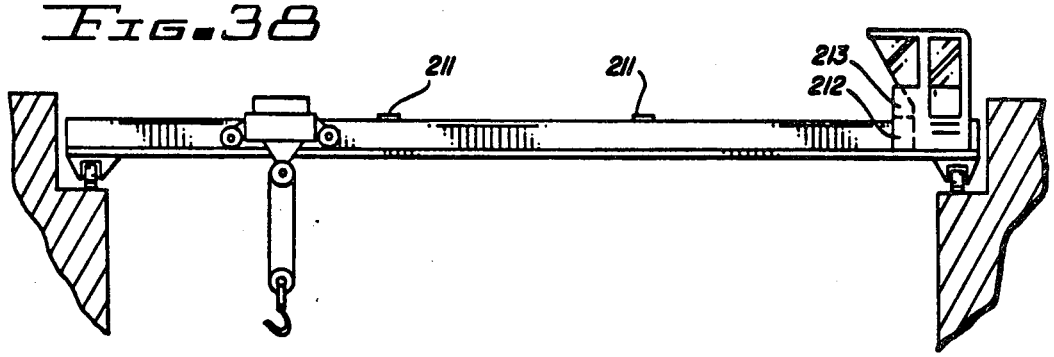
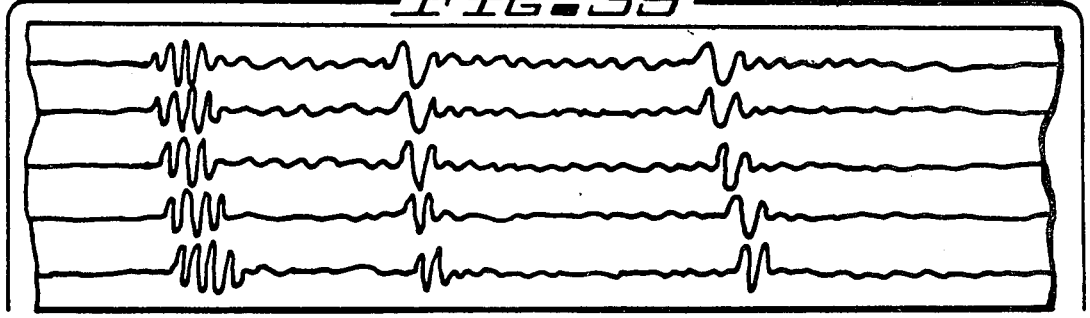
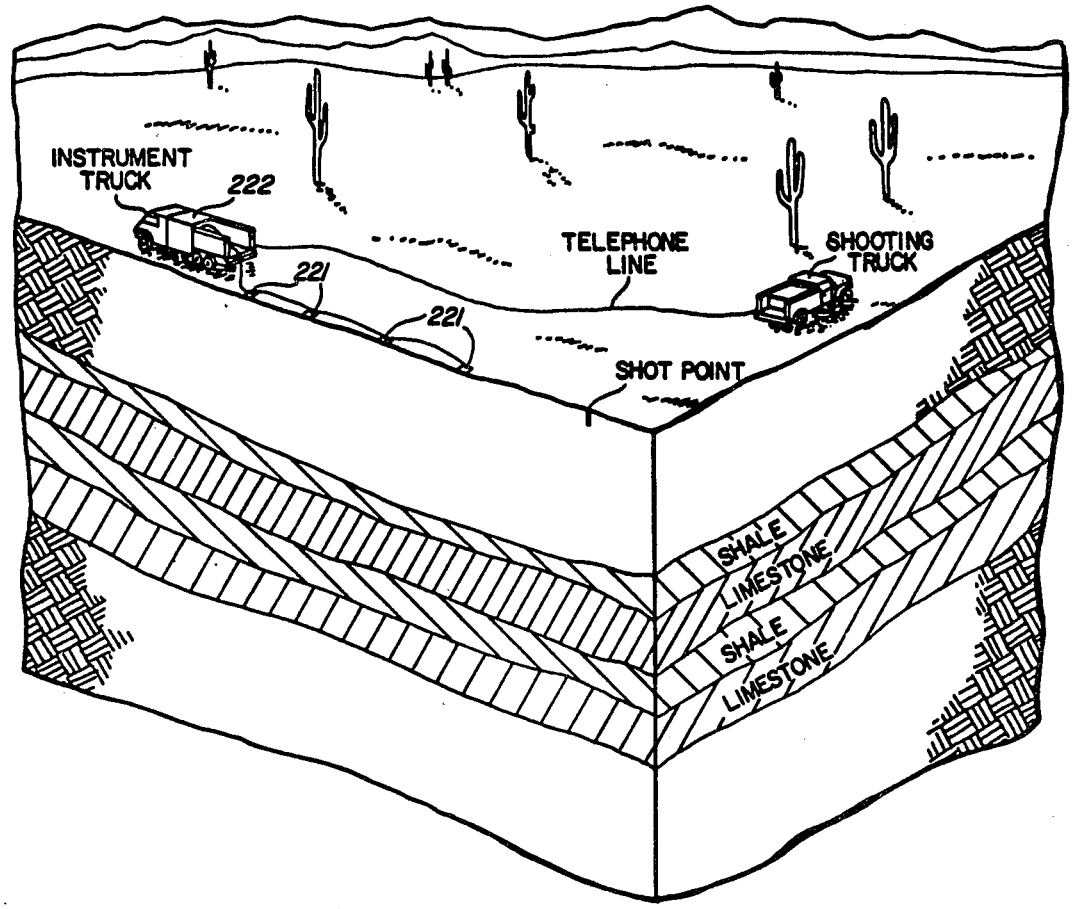

FIG_55

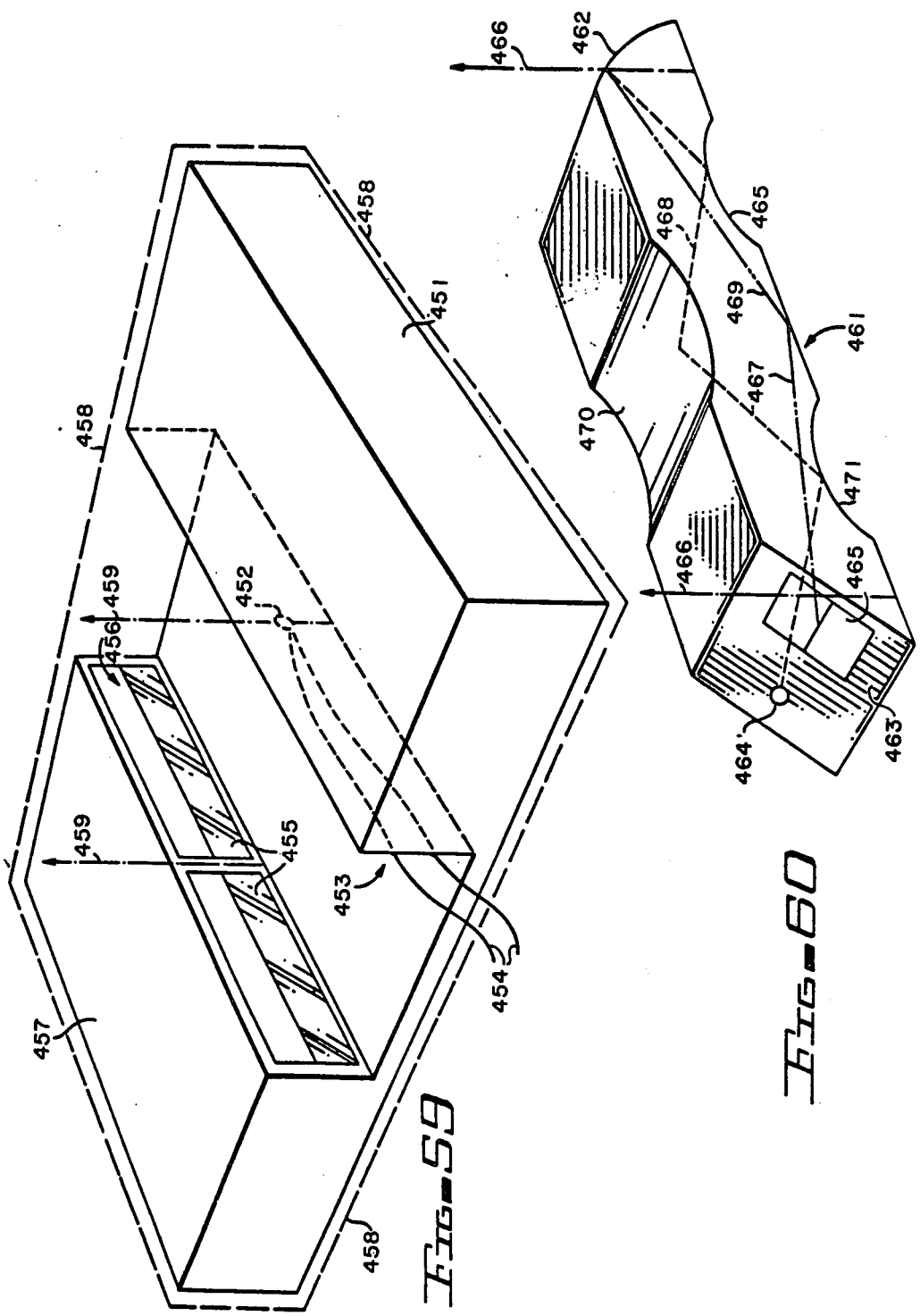

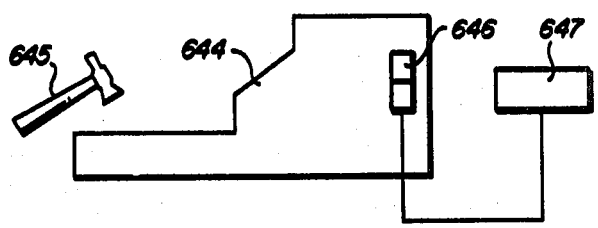
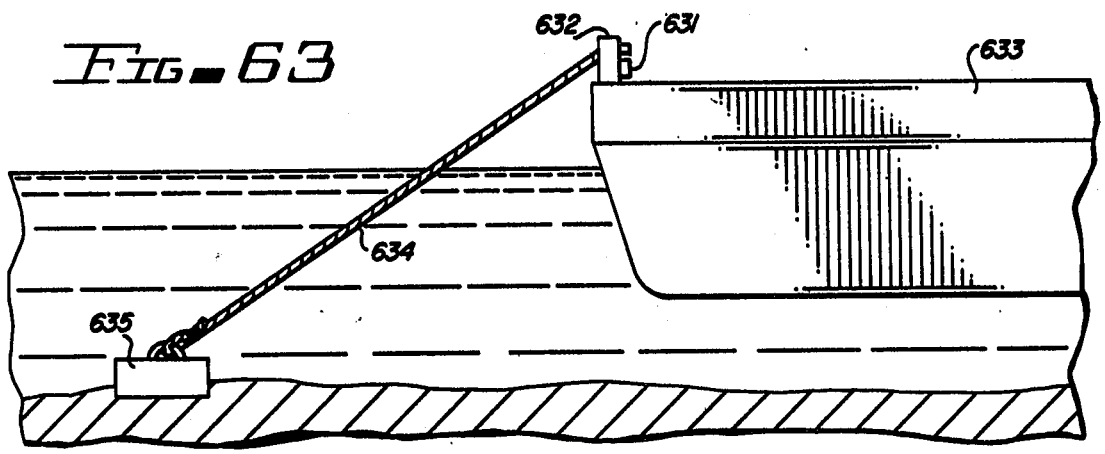
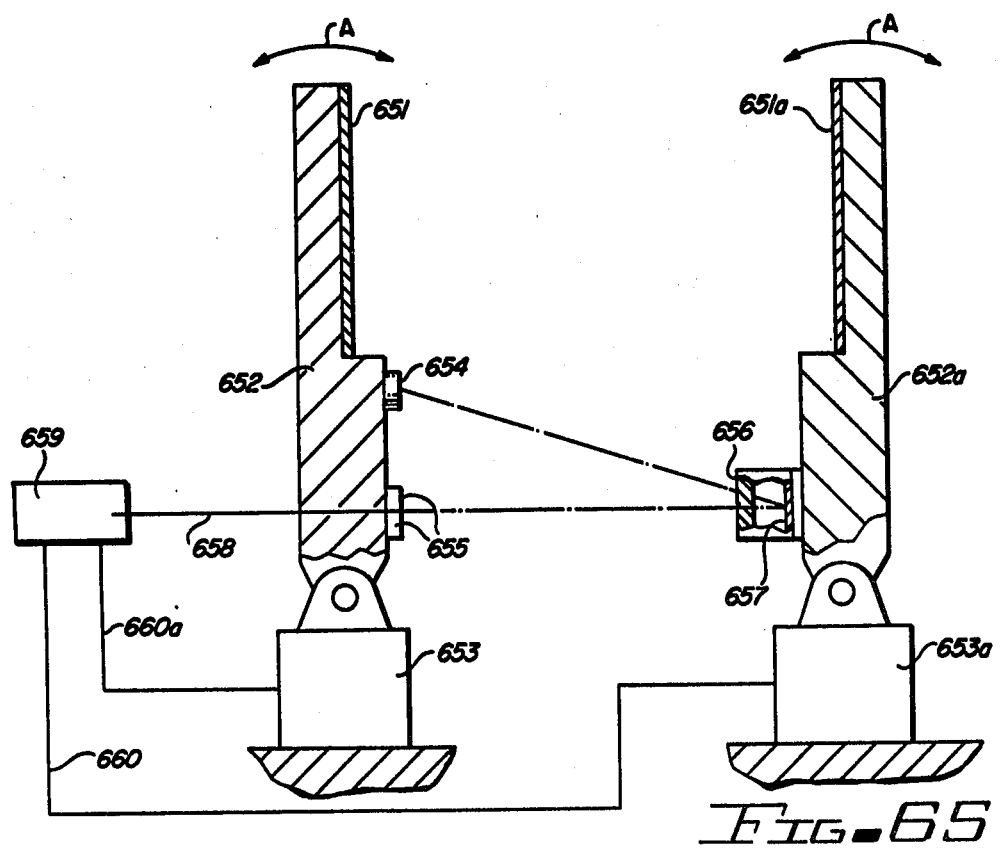

SYSTEM FOR ASSESSING THE INTEGRITY OF STRUCTURAL SYSTEMS

This application is a continuation-in-part of copending application Ser. No. 265,031, filed May 18, 1981 now abandoned, entitled "SYSTEM FOR ASSESSING THE INTEGRITY OF STRUCTURAL SYSTEMS (OMNIBUS)" and of co-pending application Ser. No. 371,321, filed Apr. 26, 1982, entitled "STRUCTURAL INFORMATION DETECTOR", now issued U.S. Pat. No. 4,409,842, both of which are, in turn, continuations-in-part of co-pending application Ser. No. 86,772, filed Oct. 22, 1979, entitled "INTRUSION ALARM SYSTEM UTILIZING STRUCTURAL MOMENT DETECTOR AS INTRUSION SENSOR AND AS RECEIVER FOR A MECHANICAL INTRUSION AND COMMAND SIGNAL", now issued U.S. Pat. No. 4,287,511.

This invention relates to systems employing structural moment detectors for collecting and interpreting data reflecting the effect of at least a selected one of a plurality of forces acting on a structure.

In a further aspect the invention pertains to such systems for assessing the integrity of a structure.

In yet another respect, the invention pertains to such systems for measuring loads applied to a structure or measuring the ability of a structure to carry its designed load.

In still another aspect, the invention relates to such systems which are employed to improve basic physical measurement schemes.

In still another respect, it pertains to such systems which are applied to effect detection and/or communication functions.

BACKGROUND OF THE INVENTION

Structural moment detectors, which are basically autocollimators which are insensitive to linear dynamic motion but which respond to angular deflection of one end of the sensor with respect to the other, are known in the art. For example, such sensors are disclosed in the patent to Rossire, U.S. Pat. No. 3,229,511, and in the publication entitled "The Structural Rigidity Sensor: Applications in Non-Destructive Testing", published by the Air Force Systems Command, U.S. Air Force (Frank J. Seiler Research Laboratory, Publication SRL-TR-75-0017, Oct. 1975). See, also, the Okubo, U.S. Pat. Nos. 4,159,422 issued June 26, 1979 and 4,164,149 issued Aug. 14, 1979.

Systems which employ structural moment detectors to measure and record certain effects of forces acting on a structure are also disclosed in the publications described above. For example, the Rossire patent discloses an aircraft attitude control system in which a structural moment detector is used to sense wing loading and automatically adjust the attitude of the aircraft to maintain wing loading within safe operational limits. The Air Force publication and the Okubo patents disclose systems which employ structural moment detectors to obtain the "vibration signatures" of various structures such as airframes, buildings, aerospace vehicles, rotating machinery bearings, dams and the like.

SUMMARY OF THE INVENTION

The present invention relates to improvements in the prior art systesm described above and to novel end-use applications of the structural moment detector and systems which include the structural moment detector as an integral element.

These systems and applications can, for convenience, be roughly categorized, as follows (it being understood that some of these systems and applications may overlap or fall into more than one category):

Basic Measurement Systems
  Structural Integrity Measurement Systems
  Applied Structural Measurement Systems
  Applied Load Measurement Systems
  Applied Communication-Detection Systems
  Additional Miscellaneous Systems Although the details of each such system and/or end-use application will vary somewhat, in general they will comprise a system for collecting and interpreting data reflecting the effect of at least a selected one of a plurality of forces acting on a structure and will include at least one structural moment detector carried by the structure for generating output signals in response to the plurality of forces acting on the structure, means for processing the output signals to modify the information content thereof (including rejecting components of said signals which reflect extraneous forces other than the selected one) and means for manipulating the processed signals to provide secondary signals which are responsive to the condition of the structure as a result of the application of the selected force.

As used herein, the term "forces acting on a structure" is intended to include not only primary external forces applied to the structure but also includes secondary external or internal effects which flow from the application of external forces or changes in the environment of the structure, such as, for example, strain energy released within the structure as a result of cracking, thermal stresses, gravity-induced effects, electromagnetic forces and stresses, and the like.

BRIEF DESCRIPTION OF THE DRAWINGS

FIG. 4 is a schematic illustration of the general system of the invention;

FIG. 5 is an illustration of one embodiment of the system used to measure weight;

FIG. 6 illustrates another embodiment of the invention which is a system used for measurement of the displacement of a mass relative to a supporting structure;

FIG. 7 illustrates another embodiment of the invention which functions as an accelerometer;

FIGS. 8-9 illustrate an embodiment of the invention which is a system for measuring ambient pressure;

FIGS. 10-11 depict a specific implementation of one embodiment of the invention which is a device for measuring angles, for example, a device that accurately points a laser beam at an angle relative to a horizontal reference;

FIGS. 12-15 depict devices embodying the invention for measuring torque and rotary power;

FIG. 26 depicts a system for assessing the structural integrity of offshore drilling platforms;

FIG. 27 depicts a system for assessing the structural integrity of dams;

FIG. 28 depicts a system for assessing the structural integrity of pipelines;

FIG. 29 depicts a system for assessing the structural integrity of land vehicles;

FIG. 33 depicts an embodiment of the invention in which SMDs are employed in systems for detecting unauthorized intrusion into a secure building area;

FIGS. 34-35 depict an application of the system of the invention to measure vehicle weight and balance;

FIGS. 36-38 illustrate an embodiment of the invention which employs the SMD systems to measure crane loads and assess the structural integrity of cranes;

FIG. 39 depicts an embodiment of the invention in which the SMDs are employed in systems for making geophysical measurements;

FIG. 63 depicts an embodiment of the invention which is used to monitor the strength of a stranded cable, such as a mooring line;

FIGS. 64 and 64A illustrate an embodiment of the invention which is used to control the quality of metal formings and other unique structures; and FIG. 65 illustrates an embodiment of the invention in which the SID or SMD with appropriate external circuitry and data-processing equipment is used in systems for aligning the reflecting mirrors of a laser cavity.

DESCRIPTION OF THE PREFERRED EMBODIMENTS

As used herein, the term "structural moment detector" means a device which measures the integral of the structure moment between two points on the structure. Such devices are known in the art, but, for clarity, a typical structural moment detector will be briefly described in FIGS. 1-3 and the accompanying descriptive material.

Figure 1:
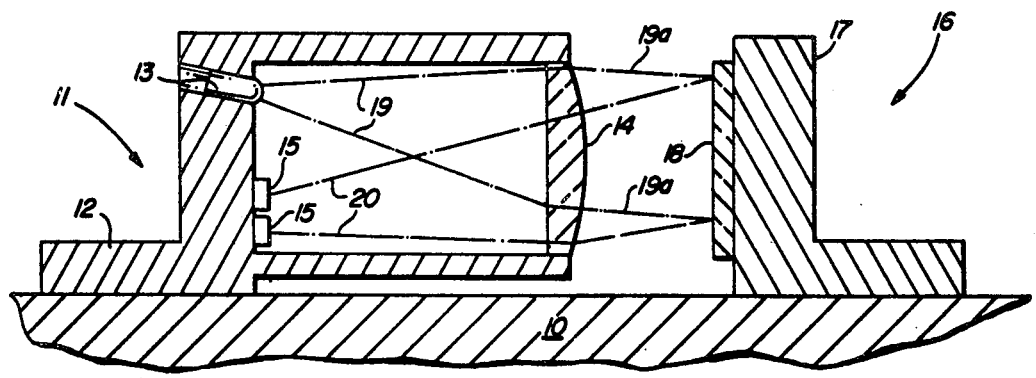
FIG. 1 is a sectional view of a typical structural moment detector which is used in the systems and end-use applications of the invention.
Figure 2:
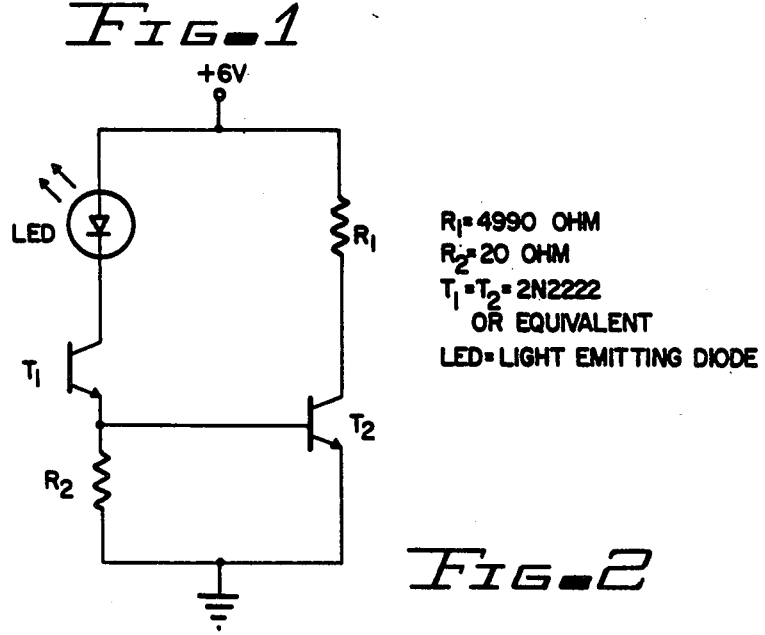
FIG. 2 is a typical schematic of the LED driver circuit of the structural moment detector of FIG. 1.
Figure 3:
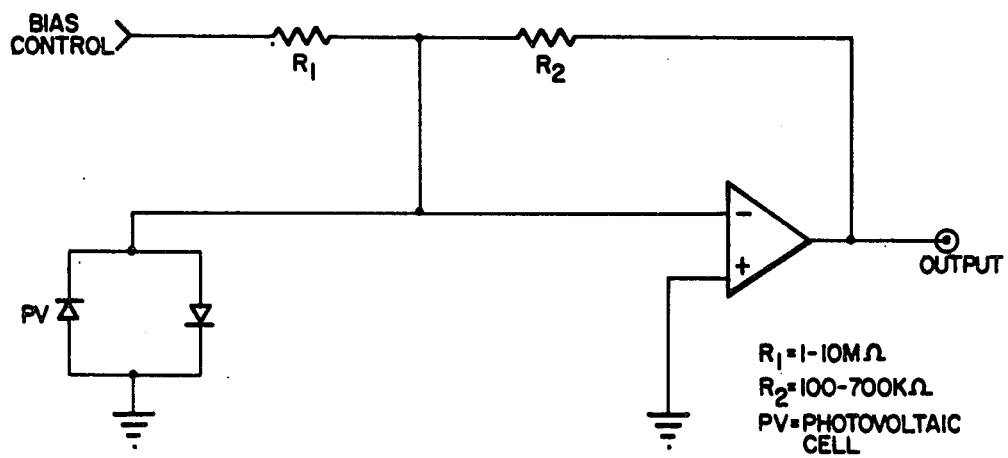
FIG. 3 is a typical schematic of the readout electronics circuits of the structural moment detector of FIG. 1.

Although FIGS. 1-3 and the accompanying descriptive material refer to one particular form of structural moment detector, it will be understood by those skilled in the art that the term "structural moment detector" is intended to include other forms of the device which function in the same basic manner.

The structural moment detector is basically an autocollimator that is insensitive to linear dynamic motions but responds to angular deflection of one end of the sensor with respect to the other. Referring to FIG. 1, the structural moment detector consists of two separate parts which are mounted at spaced locations on a beam 10. One of the parts 11 is a support bracket 12 which carries a light-emitting diode (LED) 13, a collimating lens 14 and dual photovoltaic detectors 15. The other part 16 of the structural moment detector consists of a support bracket 17 which carries a plane front mirror 18. The two parts 11 and 16 are suitably joined by a bellows or other hood member (omitted for clarity of illustration) to exclude extraneous light. The LED 13 emits an infrared light beam 19 which is collimated by the collimating lens 14. The collimated light beam 19a impinges on the mirror 18 and, as indicated by the dashed lines 20, is reflected back through the collimating lens 14 to the photovoltaic cells 15. Angular motions, but not linear motions, of the mirror 18 result in varying amounts of infrared radiation reaching each of the photovoltaic cells 15. The difference in voltage output of the photovoltaic cells 15 is then proportional to the angular motion of the mirror 18 with respect to the cells 15.

When mounted on structural building components such as floor, ceiling or wall beams, such structural moment detectors can measure the deflection of the beam with a resolution of 1 milliarc second ($4.85 \times 10^{-9}$ radians) with a range of ±6 arc seconds. Where such accuracy is not required, such devices can be fabricated which have a resolution of at least 1 arc second with a dynamic range of ±3°. Such devices are capable of operating from DC to 50 MHz, the upper limit being established by the frequency limitation of the photovoltaic cells.

Typical circuits which are used in conjunction with the mechanical components of the structural moment detector of FIG. 1 are illustrated in FIGS. 2 and 3. FIG. 2 is a schematic diagram of a suitable LED driver circuit which is a simple constant current source circuit which is required to provide a light source with constant light intensity. A typical suitable readout circuit is illustrated in FIG. 3, which depicts an analog output circuit consisting of a first stage amplifier with common mode rejection that permits linear operation of the photovoltaic cells.

The operation of the structural moment detector can be illustrated by reference to a simplified example of a cantilevered beam which is loaded and the structural moment detector is mounted at points a and b located near the supported end of the cantilevered beam. If the deflection of the beam is measured as $\theta$, the angle between surface tangents at points a and b, the output voltage of the photovoltaic cells is proportional to this angle and, according to the Area Moment Theorem $$V_{out} \propto = \frac{\int_a^b M dx}{EI} = \frac{1}{EI} \int_a^b M dx$$

where

M is the applied moment between points a and b
E is the modulus of elasticity
I is the moment of inertia
$\theta$ is the angular difference between surface tangents at points a and b
x is the linear surface distance between points a and b.

If a load P is placed on the end of a beam of length L and $\delta$ is the distance between points a and b, then $$V_{out} \propto \theta = \frac{1}{EI} \frac{PL\delta}{2}$$

To illustrate the sensitivity of the structural moment detector, a load of 1 gram was placed on the end of an 8" cantilevered beam. The device was mounted near the support of the beam such that points a and b were 1.5" apart. With this load $V_{out} = 30$ millivolts and $\theta = 1.3 \times 10^{-7}$ radians.

Since it is impossible to load a structure without changing the total moment which occurs between two points on the structure, it is possible to use the structural moment detector as an extremely accurate and extremely sensitive sensor having a range which far exceeds that of conventional sensors of the prior art.

As disclosed above, the SMD is combined with external signal and data-processing components, including appropriate software, to yield the desired information concerning the effect of forces acting upon a structure to which the SMD is attached. It is to be understood that the signal-processing and dataprocessing components may also be integrally combined with the SMD in a unitary device, the output of which is directly usable to indicate the condition of the structure. Such unitary devices, which we call "Structural Information Detectors", including exemplary circuitry, are disclosed in our co-pending application Ser. No. 371,321, filed Apr. 26, 1982, entitled "Structural Information Detector", now issued U.S. Pat. No. 4,409,842.

As previously indicated, the various systems of the invention fall into several basic categories. In general, however, with exceptions noted below, the various systems will generally include similar elements in addition to the structural moment detectors. The general system of the invention is schematically illustrated in FIG. 4. As shown in FIG. 4, the structural behavior 41, which is effected by the forces acting on the structure, are sensed by an array 42 of structural moment detectors (SMD's), located on the structure. The SMD's 42 are located on the structure so as to provide primary electronic signals 43 which are proportional to the structural behavior parameter of interest. The primary electronic signals 43 from the SMD array 42 are fed to signal processing and buffering equipment 44, which includes electronic circuitry which modifies the information content of the primary signals 43 (e.g., rejection of background noise, rejection of signal components induced by other forces, etc.) and which electrically isolate the sensors from the remainder of the system. The processed signals 45 are then trasmitted to analog-to-digital converters 46 which convert the analog information in the processed signals 45 to a digital format compatible with various digital processors, recorders, editors and/or display units. The digital signals 47 are then transmitted to a data processor 48 which will usually be a single-frame computer which is capable of accepting digital data and manipulating it in a predetermined, programmable fashion, in order to convert the digitized measurement information into a digital representation of the desired system data. The digital representation data 49 is optionally transmitted to data recording/editing equipment 50 which may provide for permanent recording of all or part of the acquired data for later use and which may, additionally, provide manual editing capability. The recorded and/or edited data 51 may optionally be transmitted to data display equipment 52 which provides visual display of the acquired data and, additionally, may provide for the predetermined alteration of the means by which the data processing equipment 48 is transforming acquired data or the manner in which data is digitized, recorded, edited and/or displayed. Feedback loops 53 may be optionally provided, through which the information at one stage is fed backwardly and/or forwardly to another stage of the system to provide improved accuracy, estimation, prediction or other similar functions. These feedback paths may be electrical, optical, mechanical and/or may involve human interpretations and adjustments Various improved systems and applications which embody the present invention will be discussed below in the groups of categories previously indicated.

BASIC MEASUREMENT SYSTEMS

According to the invention, SMD's are employed in systems which perform measurement of basic parameters such as weight, displacement, acceleration, pressure, angle and torque/power.

Weight Measuring System

In this embodiment, the SMD is mounted on a suitable structure such as a cantilevered beam with known flexural rigidity. The output of the SMD is $$O_{SMD} = \frac{1}{EI} \int \int f(\text{loading})\, dx$$

where $1/EI$ is the effective flexural rigidity of the structure and f(loading) indicates the local bending moment due to the structural loading. If EI is known, then the sensor output is directly related to the weight (load) applied.

The SMD measurement system is much more sensitive than current systems which employ balances, pressure, transducers, strain gages or springs. Hence, this system provides for precise measurements of weight without moving parts and without sophisticated electronics.

FIG. 5 shows an embodiment of this system in a bathroom scale. The SMD 55 is mounted on a cantilevered beam 56. Weight indicated by the arrow 57 on the platform 58 deflects the beam 56. The SMD 55 output is processed in the electronics package 59 and the processed data is transmitted to the display 60.

Similar implementation can be made for precision measurement of very small weights or very large weights by appropriate design of the cantilevered beam.

Displacement Measuring System

In this embodiment of the invention, the SMD is used in a system for measuring the displacement of a mass relative to a supporting structure or vice versa. Referring to FIG. 6, an SMD 61 is mounted on a cantilevered beam 62 which is supported in a rigid case 63 with a mass 64 located at the tip of the beam 62. The output of the SMD 61 is processed and used with the beam equations to yield a secondary signal which provides a direct measurement of the displacement.

Thus, if the case 63 is rigidly mounted to another structure, and that structure suddenly moves, the inertia of the mass 64 causes it to remain instantaneously fixed while the case 63 moves with the structure. The output of the SMD, suitably processed, is then a direct measurement of the displacement of the structure relative to its initial position. This information can then be used to correct calculations or in a feedback loop to reposition the structure.

This information is currently obtained by using accelerometers and integrating their output twice. According to this embodiment of the invention, the required integrations are eliminated through the use of elementary beam theory.

Acceleration Measurement System

In this embodiment of the invention, the SMD is used in a system which functions as an accelerometer. Referring to FIG. 7, the SMD 71 is mounted on a suitably configured and tuned cantilevered beam 72 which is firmly supported in a case or mounting structure 73. An adjustable weight 74 at the free end of the beam 72 permits the beam/SMD combination to be adjusted for sensitivity and natural frequency.

The output of the SMD is fed to an electronics and processing module 75 where the information is processed according to programmed instructions for further use or display.

Pressure Measuring System

In this embodiment, the invention provides a system for measuring pressure. Referring to FIG. 8, an SMD 81 is mounted on a rectangular diaphragm 82 which separates two chambers in a rigid case 83. The lower chamber 84 may be evacuated, pressurized to a known pressure, or exposed to ambient pressure through a valve 85 which will permit only very slow equalization of the pressure in chamber 84 with ambient pressure. The upper chamber 86 is open to ambient pressure. In operation, the pressure differential across the diaphragm 82 causes it to deflect and the magnitude of this deflection is sensed by the SMD 81 which produces an output signal which can be calibrated to produce a direct measurement and/or readout of pressure. This system provides for substantial improvement of current pressure transducers in that the extreme sensitivity of the SMD 81 and the ability to vary the thickness and material of the diaphragm 82 provides the capability for measuring very small differential pressures. By using thicker diaphragms and less-sensitive SMD's, the system can be used to measure massive pressures. The frequency response of the SMD enables the device to operate over a wide band width of 0-50 KHz. These systems can be used to measure pressure differentials as well as absolute pressure, i.e., the reference may be to other than ambient pressure.

Angle Measuring System

In this embodiment, the SMD is used in a system for accurately measuring angles or for precisely aligning other devices such as lasers. FIGS. 10-11 depict a specific implementation of this system, a device which can be used to accurately point a laser beam at an angle relative to a horizontal reference. The system of FIGS. 10-11 consists of a baseplate 91 rigidly aligned in the reference direction 92. A cantilevered beam 93 is mounted on the baseplate 91. The SMD 94 is attached to the beam 93. The laser 95 is mounted on the beam 93 such that the beam is initially aligned with the reference direction 92. In operation, the thumb screw 96 is turned to elevate the tip of the beam 93. This deflection is sensed by the SMD 94 and the output is calibrated to provide a direct reading of the angle, adjusted to give the desired pointing angle.

To measure an angle with the device shown in FIGS. 10-11, the device is positioned at the apex of the angle to be measured. The laser beam 95 is initially pointed along one leg of the angle to be measured. The thumb screw 96 is then adjusted until the laser beam 95 points along the other leg of the angle. The SMD reading is then a direct measurement of the angle.

Torque/Rotary Power Measuring System

In this embodiment of the invention, an SMD is incorporated in a system for real-time measurement of the torque and/or rotary power of an operating machine. In almost all industrial efforts, it is necessary to generate, transmit and receive rotary shaft power. In order to determine the efficiency with which any particular rotary machine performs its intended function, it is necessary to provide a system for measuring the torque and/or shaft power of the machine. This is usually accomplished by devices which apply a specifically designed artificial load to the shaft. This load and the rotational speed permit calculation of the shaft power. Despite relatively low resolution and accuracy, such devices represent the state-of-the-art in rotary power measurement. A particular disadvantage of the prior art rotary power measuring systems is that they do not provide a measure of the shaft power when the system is driving its actual load.

The present invention provides a system for accurately indicating real-time rotary power delivered. When a shaft of any cross-sectional area or shape is subjected to torque, the shaft undergoes twist. An SMD, mounted on this shaft, can measure the amount of twist and hence, the torque. The power delivered to the rotary shaft is equal to the torque times its angular velocity. Thus, direct measurement of torque coupled with rotational speed provides a real-time measurement of shaft power.

Referring to FIGS. 12–15, according to this system, an SMD 101 provided with a specially designed case 102 which is modified to fit the surface of an engine output shaft 103, is mounted on the output shaft 103 of an engine 104 which drives a load 105. The output 106 of the SMD 101 and the output 107 of an r.p.m. sensor 108 are fed to a data processor 109. The outputs of the data processor 109 are torque, r.p.m. and power signals which can be displayed or otherwise used in other operations.

STRUCTURAL INTEGRITY MEASUREMENT SYSTEMS

In addition to performing the basic measurements described above, SMD's are employed, in accordance with another aspect of the invention, in systems which measure the integrity of various structures.

Aircraft Structural Integrity System

In accordance with this embodiment of the invention, SMD's are employed in systems which provide information concerning structural fatigue, active crack detection, overload conditions, load history and vibration for the purpose of assessing structural loads on aircraft, the remaining lifetime of the aircraft, the condition of components of the aircraft, the operational history of the aircraft, the compliance of structural members with known loadings, the current ability of the aircraft to carry its design loads and to provide more effective and efficient maintenance and test procedures.

The ultimate function of the aircraft structural integrity system of the present invention is to prevent catastrophic structural failure of the aircraft through structural integrity assessment.

Airframes are designed to meet desired strength and fatigue life requirements by projecting the average load environment of the aircraft over the expected airframe lifetime. These projections are, in turn, based on averaged load history data concerning similar aircraft designed for similar services. Since aircraft receive such diversified use, however, it is very difficult to assign confidence limits to the statistics thus assumed. One particular aircraft could experience a load history quite different from the expected load history assumed in the original design. In terms of accumulated damage, this airframe could actually be much "older" than the recorded engine or airframe hours would suggest. Nevertheless, aircraft are normally inspected for critical flaws based on the accumulated flying time or engine operation time. The assumption is that this number of hours is correlated with the load history actually experienced by the aircraft. The possibility for error is obvious; 100 hours flying along the front range of the Rocky Mountains can represent a considerable different load environment from 100 hours flying over Kansas wheatfields. Nevertheless, present aircraft structural integrity assessment techniques almost invariably employ airframe or engine operating time to determine when inspections should be made, followed by actual inspection of the airframe to estimate the remaining fatigue lifetime.

According to the present embodiment of the invention, aircraft structural integrity assessment is performed using systems which include SMD's which act, in effect, as a damage counter, providing continuously updated real time assessment of the remaining fatigue lifetime of the airframe. The system achieves this function by one or a combination of monitoring structural cracks as they occur and continuously assessing the remaining fatigue lifetime of the airframe (structural failure monitoring), warning of impending failure of the airframe due to loads which approach or exceed the design loads (load measurement), by warning of impending engine failure (vibration monitoring), and by directly measuring the compliance of structural members subjected to known loads.

Figure 16:
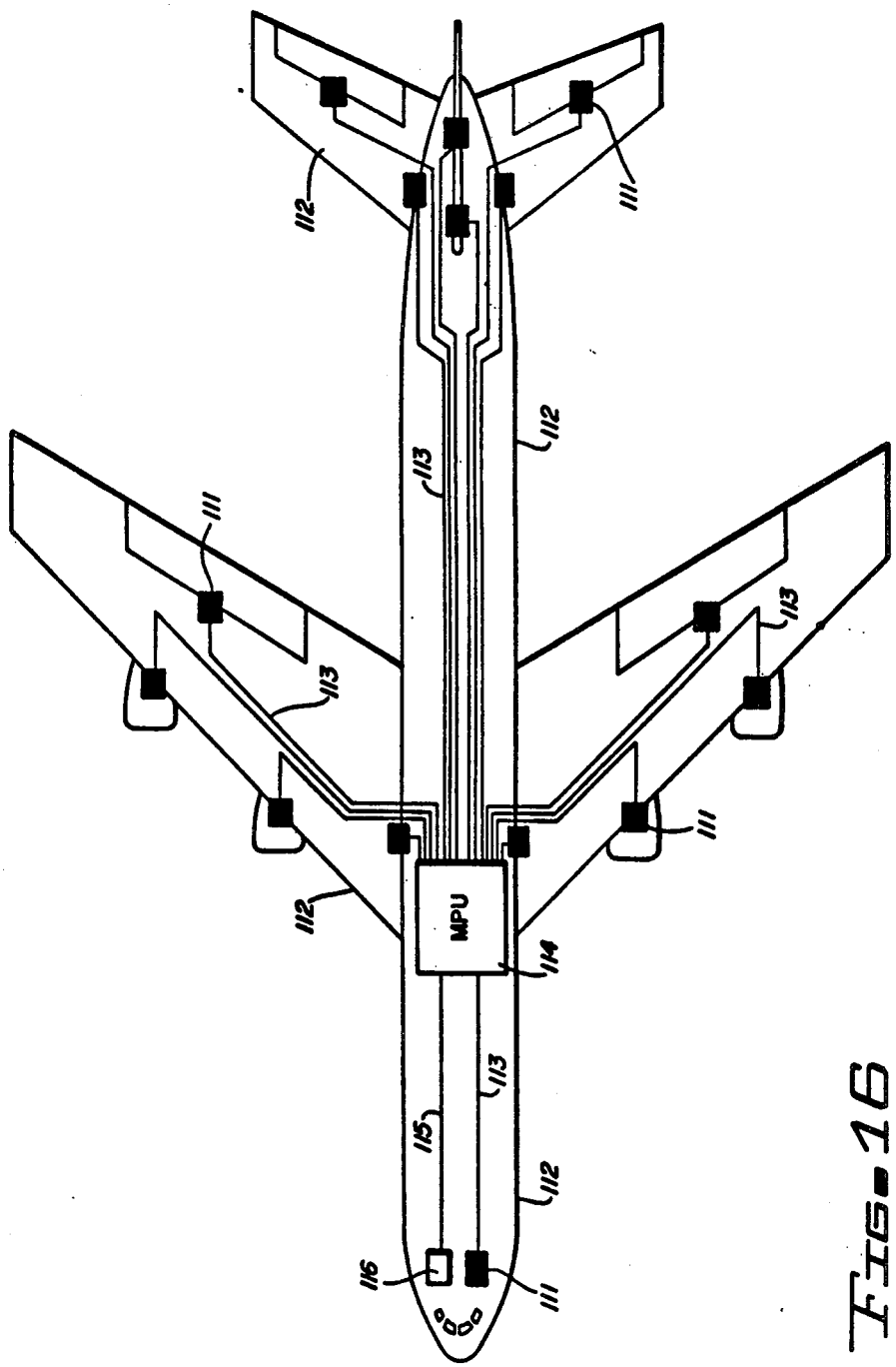
FIG. 16 depicts an embodiment of the invention in which the SMD systems are used to assess the structural integrity of an airframe.

Referring to FIG. 16, in the present embodiment of the invention a plurality of SMD's 111 are mounted at selected locations on airframe 112 and are properly oriented to be sensitive to the selected parameter to be measured. The SMD's 111 are connected through cabling 113 to the processing electronics 114 (signal processing and buffering, A–D conversion, data processing, data recording and editing) and the output 115 is suitably displayed 116 and/or stored.

Figure 17:
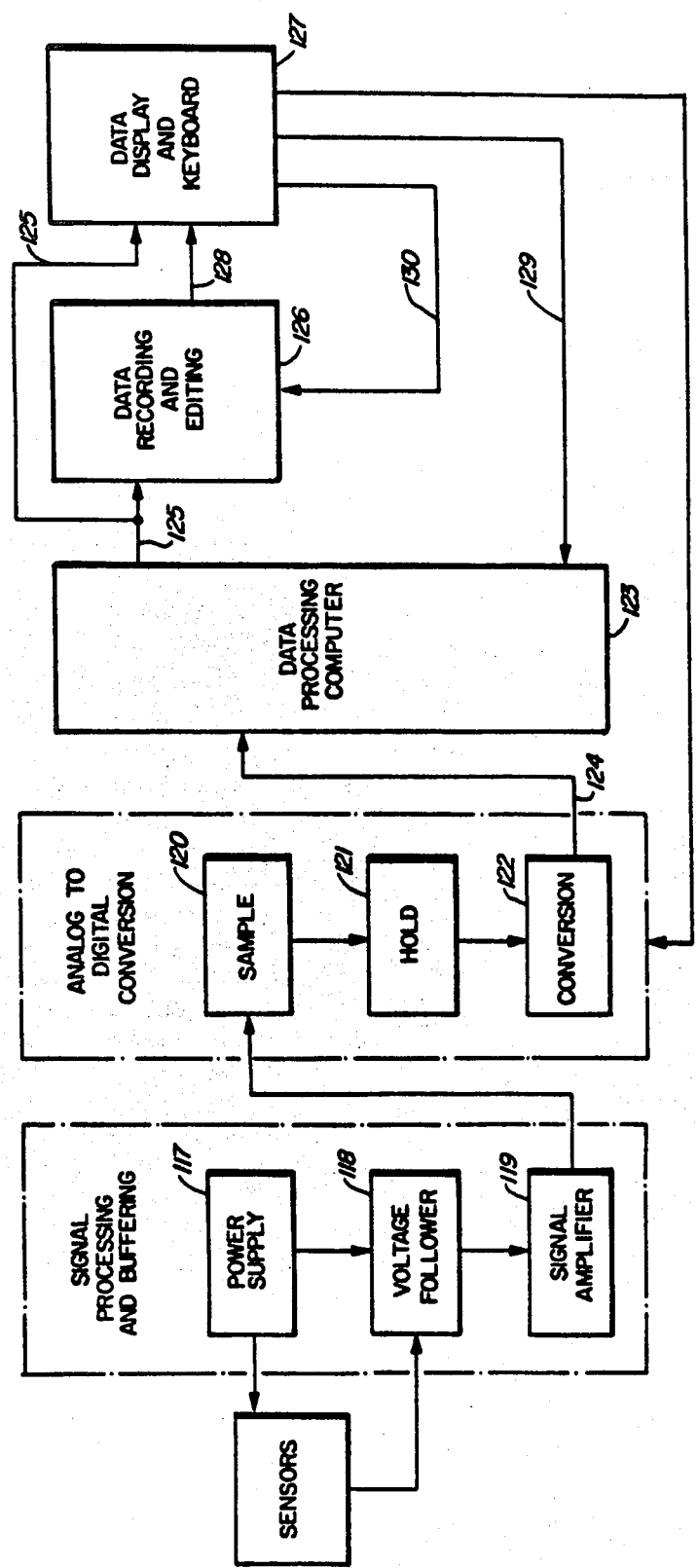
FIG. 17 shows in greater detail a system for measuring aircraft structural integrity which is a special adaptation of the general system it illustrates in FIG. 4.
Figure 19:
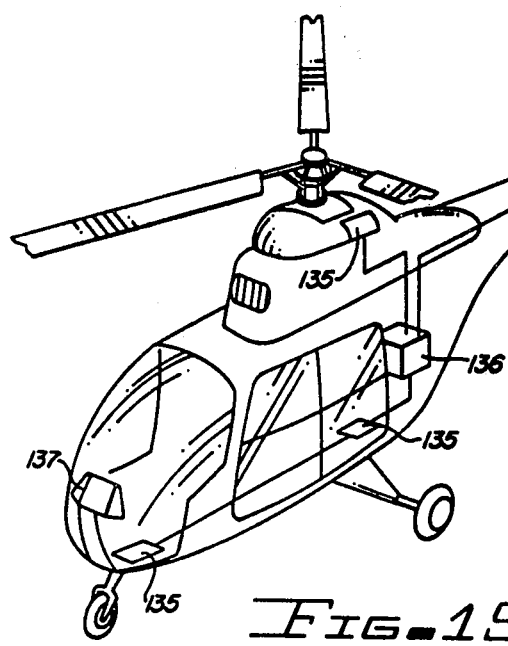
FIG. 19 depicts a typical implementation of the invention as used for assessing the structural integrity of helicopters.

FIG. 17 shows in greater detail a system for measuring aircraft structural integrity which is a special adaptation of the general system illustrated in FIG. 4 are, as shown in FIG. 19, individual units for each sensor consisting of power supplies 117, voltage followers 118, and signal amplifiers 119. The power supply provides conditioned power to the sensor and powers the signal processing electronics. The voltage follower converts the sensor output to a buffered analog voltage signal The signal amplifier amplifies the signal from the voltage follower.

The analog to digital converter either individually or collectively converts the analog information from the sensors to a digital format compatible with that required by the computing, processing, recording, editing and display units. Basically, the A–D converter samples the analog signal 120, holds the sampled value as a constant voltage 121 and converts the voltage level 122 to binary data.

The data processing computer 123 is a single frame computer capable of accepting the digital data 124 and manipulating it in a predetermined programmed fashion to convert the digitized data into a representation 125 related to aircraft or engine structural integrity The output 125 may include information concerning the existence of cracks, the severity of the cracks, the loads experienced by the aircraft, the load history, the fatigue lifetime of the structure, the integrity of engines or engine mounts, the vibration signatures and other information involving aircraft or engine structural integrity.

The data recording and editing device 126 provides for permanent recording of all or part of the acquired data 125 for use at a later time and, additionally, provides the capability to manually edit the acquired data.

The data display and keyboard device 126 provides a visual display of either the data 125 acquired from the computer 123 or of the recorded edited data 128 from the data recording and editing unit. Additionally it provides, by means of feedback loop 129, for predetermined alteration of the means by which the data processor 123 is transforming acquired data 124 or, by means of feedback loop 130, the manner in which the data 125 is recorded, edited, displayed or digitized. The keyboard 127 is for data/command entry to the system.

(a) Structural Failure Monitoring

There are essentially two independent methods of detecting incipient failure of the structure. The first method involves measuring the frequency response and/or compliance of a structure and its variability with time. The second method involves measuring the seismic waves in the structure induced by cracking or other structural failure.

Most aircraft structures can be considered to be nearly elastic systems. Even structures formed with composite materials have vibration characteristics which are well defined and repeatable. It is known, both analytically and experimentally, that the natural modes of vibration of a structure are distinct, well-defined and a function of the physical dimensions of the structure and the internal properties of the material. Any changes in these factors will change the natural frequencies and the associated vibrational modes of the structure.

Certain characteristics of the aircraft which change slowly over its lifetime, such as elasticity of the various structural members, may be initially calibrated by observing deflections under ground test conditions and thereafter continuously monitoring the vibrational mode frequencies and shapes. In accordance with the invention, impending structural failure can be observed by monitoring the changes in these mode shapes and frequencies. Further, shock waves from very small crack propogation centers can be easily detected.

Initial calibration of the aerodynamic coefficients may be accomplished by flying aircraft on specifiable paths, such as high-speed taxi runs and take-offs that terminate in a landing on the same runway, optionally in opposite directions to eliminate effects of wind, after performing such prescribed maneuvers as stalls, turns and high-speed passes. Changes in aerodynamic coefficients due to environmental conditions, such as rain or ice, are then observed as changes in deflections without associated changes in elasticity (as observable through structural frequency of the natural modes). Rapidly changing variables such as aircraft mass is initially calibrated by observing deflections of the landing gear, suspension points on the ground, and thereafter estimated by counting engine cycles and observing changes in mode shapes and frequencies associated with fuel depletion.

With these techniques, the components structural deflections which may have aerodynamic (life, side force and drag), inertial (g loading), thermal loading, engine vibration loading, transient aerodynamic loading, operation of aircraft subsystems (i.e., drag brakes, landing gear, flaps and engine controls) can be effectively separated.

With information sensed from the SMD sensor system, the changes in the frequencies of the natural modes of the structure due to changing physical dimensions and internal material properties will be determined by the microprocessor.

Each structure will have a distinct set of natural frequencies and will have a well-defined impulse response when the structure is new, unfatigued and has no existing cracks. When changes occur, such as cracking or fatiguing, the impulse response will change due to changing natural frequencies of the structure. Thus, continuous identification of either the impulse response or equivalently the frequency spectrum of the structure allows for identification of structural changes of appreciable size.

To implement active crack detection in an air vehicle that has been optimized for strength-to-weight ratio, where many components operate near the structural limits, requires an alternate real time approach. In such aircraft, the materials used such as aliminum, fiberglass and advanced composites, fatigue can readily reduce the useful life of the aircraft. If such an aircraft is subjected to inadvertent adverse loads or the structure material has unsuspected material defects, the onset of structural failure may occur with a catastrophic discontinuity. The early signature of such a failure may be manifested in exceedingly small cracks in the structure which can result in structural failure in relatively short order. The prior art procedure for crack detection in aircraft involves visual and/or electronic inspection of the aircraft on the ground. Since extremely small cracks are of great significance in these types of structures, inspection procedures are most costly and relatively ineffective.

According to the invention, these exceedingly small cracks are detected as they occur in flight by taking advantage of the fact that the formation of cracks involves a substantial release of strain energy. The release can be detected by the SMD sensor and, when processed by the microprocessor, the occurrence of the crack can be separated from the inertial and aerodynamic forces simultaneously inducing the observed structural deflections.

Cracks occur in a material in an attempt to relieve the stress created by incident forces. This results in a release of strain energy. This energy is expended in essentially two forms: (1) the formation of the surface of the crack, and (2) the kinetic energy for crack propagation.

It is well-known that the crack velocity is significantly less than the velocity of sound in the material. For example, in aluminum, the crack velocity is no more than 3/10 the speed of sound in the material. Therefore, if a crack propagates only a short distance, the acoustic fault has already been transmitted through the structure and is sensed by the SMD sensor means. This phenomenon is similar to an explosion in the air where the shock wave propagates much faster than the explosive products.

Materials, such as glass at room temperature, undergo brittle fracture. The same is not true of metals, for instance, which are capable of deforming by slip and twinning even at very low temperatures. It has been observed that even when a metal fails by brittle cleavage a certain amount of the plastic deformation almost always occurs prior to fracture. Metals therefore do not fracture as a result of pre-existing cracks but, in many cases, by cleavage cracks nucleated as a result of the plastic-deformation process. Present theories favor the concept of dislocation interactions as inducing cleavage nuclei. Dislocations on different slip planes can combine to form new dislocations on the fracture plane, thereby opening a crack. Alternately, slip on a given plane can be impeded by some sort of barrier leading to a pile-up of dislocations which, in turn, nucleate a crack. An obstacle to slip must be very strong so that it can stand the high stress at the head of the dislocation pile-up.

Deformation twins and grain boundaries are obstacles with sufficient strength to stand the high stress.

Therefore, in materials such as metals, energy is lost due to plastic deformation in addition to crack formation. When slip takes place during the movement of a crack, energy is absorbed in nucleating and moving dislocations. If the energy required to overcome plastic deformation becomes too large, the crack may decelerate and stop. Thus, detection of these cracks after they occur is a very difficult task. At the instance of crack occurrence, however, energy release will excite lightly driven frequency modes and drive acoustic waves within the material. Because of the broad frequency response of the SMD, it can easily detect this energy release. Because of the sharpness of the pulse, time of arrival techniques can be used to ascertain the approximate location of origination of the acoustic pulse.

(b) Vibration Monitoring

The concept of monitoring the vibration signature of a mechanical system for an indication of the mechanical health of the system is well established. Every operating mechanical system has a distinct vibration signature which is produced when the system is operating properly.

When a malfunction occurs the signature changes. Appropriate observation and analysis of the vibration signature can therefore provide an early indication of the severity and location of possible trouble and can help to prevent costly catastrophic failure.

The actual vibration signature of an aircraft contains many frequencies. This is a result of different components vibrating at various discrete frequencies and various mechanical resonances and nonlinear combinations of those signals in the machine. The resultant signal at a measurement point is therefore a complex vibration wave form which must be processed to reduce it to its discrete frequency components for analysis.

A typical prior art vibration monitoring system consists of sensors (vibration transducers), a signal processor (monitoring system) and suitable displays or alarm generating devices. The sensors commonly in use are the piezoelectric accelerometer and the inductive velocity transducer. While there is limited agreement on the specific crossover frequency, there is general agreement that vibration severity is proportional to velocity at relatively low frequencies and proportional to acceleration at high frequencies. Thus, the applications of the piezoelectric and velocity transducers are naturally separated by frequency. In addition, velocity transducers are generally rugged, operate over wide temperature ranges, produce relatively high signal to noise outputs, but are limited to about 1000 Hz. Piezoelectric accelerometers are more sensitive to contamination. Both have frequency ranges which are significantly influenced by the method of attachment to the machine.

Both the velocity transducer and the piezoelectric accelerometer respond to displacements perpendicular to their mounting surface. The structural moment detector (SMD) however, measures the difference between planes perpendicular to the surface to which it is mounted, that is, the measurement motion is 90° to that of other sensors.

The significant point is not that suitable mountings will permit direct replacement of velocity transducers, strain gages and piezoelectric accelerometers. The significant point is that the SMD responds to transverse and longitudinal waves in a body which cause the surface to deflect as little as $3.5 \times 10^{-9}$ radians across the 1.5 inch length of the sensor (a surface displacement of $5.3 \times 10^{-3}$ microinches). This is a new and unique measurement and it provides new information for vibration monitoring systems, especially suited to aircraft structural integrity systems.

In the measurement of these ultra small deflections, the SMD has a frequency response which is essentially flat from 0 to 40 kHz. Combinations of velocity and acceleration sensors in the best vibration monitoring systems currently in use, provide a flat response from 0 to 20 kHz only.

(c) Aircraft Load Measurement

Another application of the systems of the present invention is the direct measurement of the ability of various aircraft structural members to carry a specific load. The output of the structural moment detector is $$O_{FRS} = \frac{1}{EI} \int f(\text{loading}) \, dx$$

where $1/EI$ is the effective flexural rigidity of a member of the aircraft structure and f(loading) indicates the local bending moment due to the loading on the structural member. The ability of the structural member to carry its design load can be assessed by imposing a known load which is small relative to the design load on the structure and using the output of the SMD to determine the flexural rigidity of the structure. Changes in the ability of the structural member to carry its design load result in changes in the flexural rigidity of the member and these changes can be translated into an indication of the severity of the change. This measurement makes use of the static (IX) output of the SMD.

According to the present invention, the inverse of the above described operation is used to measure the actual load imposed to an aircraft structural member. If the flexural rigidity is known, then the sensor output is directly related to the load.

With appropriate signal processing it is possible to frequently evaluate the flexural rigidity of the member using autocorrelation techniques and then use that value of flexural rigidity to determine the existing loads. Thus, knowing both the load carrying capability of the member and the actual load, it is possible to predict impending failure.

(d) Altered Structural Capability Measurement

According to this embodiment of the invention a system is provided for assessing the structural capability of an aircraft or other structure which has been purposely modified or repaired or which has altered capability as a result of the accumulation of ice, wind damage or other environmental effects. This system uses the unique measurement of the SMD to infer the existing flexural rigidity of structural members. This measurement is then compared with design values and an assessment is made.

In one implementation of the system the sensor is mounted on a beam which has fractured and has been repaired by welding. The SMD output is processed to provide the flexural rigidity of the welded beam. This value is compared with the value of the unfractured beam to determine if the repair has returned the structure to its original strength.

In another implementation the sensor is mounted to a beam whose strength has been increased by the addition of other members. The SMD output is processed to provide the flexural rigidity of the strengthened beam.

This value is then compared with the design value to see if the desired strength has been achieved.

Figure 18:
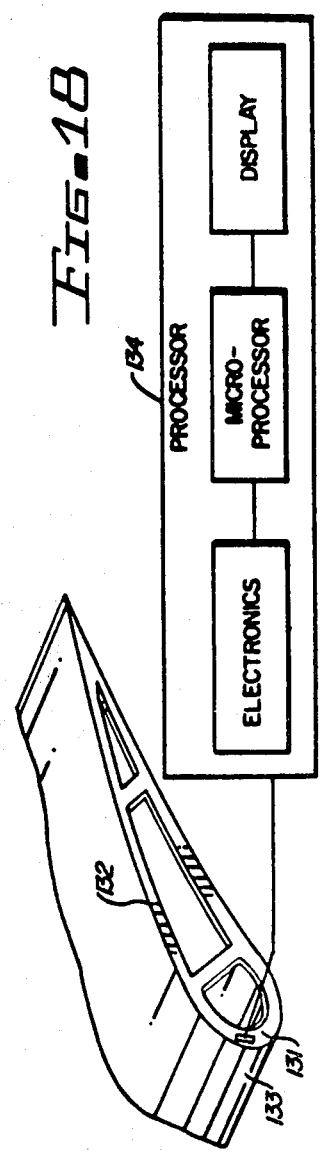
FIG. 18 depicts an implementation of the system of the invention for measuring altered structural capability of an aircraft.

Yet a third implementation is depicted in FIG. 18. The SMD 131 is mounted near the leading edge of the airfoil 132. The SMD output is processed 134 to determine flexural rigidity. The value obtained differs from the design value as a result of the accumulation of ice 133. This difference is used as an indication to the pilot that his airplane wing has an accumulation of ice.

(e) Structural Integrity Assessment Systems For Helicopters

According to this embodiment of the invention, a system is provided for assessing the structural integrity of helicopters. In this embodiment, certain aspects of the aircraft structural integrity systems, described above, and of other load and structural measurement systems, described below, are combined to produce a system tailored especially to the unique requirements of measuring the structural integrity of a helicopter structure. Helicopter structures present unique problems because of the relatively low frequency but large amplitude of rotation and vibration of the helicopter rotor system.

Technical failures, involving materials or components, which result in helicopter accidents include failures of: (1) power plant (2) power train (3) driveshaft (4) rotor blades and (5) rotor hubs. Primary causes of failures include incorrectly fitted parts, high stress concentration and cyclic exitation resulting in fatigue.

According to this embodiment, a plurality of sensors are mounted throughout the helicopter. Signal processing techniques, including adaptive filtering and adaptive noise cancellation techniques are used to separate the background noise from crack initiation and propogation signals. In addition, vibration signatures of the major components mentioned above are monitored. Any significant changes are used to assess structural integrity.

One mode of implementation of the invention is shown in FIG. 19. SMD sensors 135 are mounted near rotating mechanical parts and along main structural members. The sensor outputs are fed to the electronics, microprocessing and recording unit 136. The data is processed according to the preprogrammed instructions and appropriate information is then displayed 137 to the pilot and/or recorded for use by maintenance personnel after landing.

Other Structural Integrity Systems

The basic measurement techniques and systems for assessing structural integrity of aircraft can, with appropriate modification, be applied to measure the integrity of many other structures.

(a) Space Vehicles

According to this embodiment of the invention, the aircraft structural integrity systems, described above, are applied to the unique requirements of space vehicles.

In particular, the large change in total mass of rocket powered vehicles during rocket burn introduces significant changes in the structural modes of the vehicle. As a result, thrust magnitude and direction are often actively controlled to compensate for these changes. The sensitivity of the SMD systems permits measurement and interpretation of changing structural parameters.

Another factor unique to space vehicle integrity is the zero g environment. The interpretation of structural information as the vehicle goes from one g loading through the high g loading during launch or maneuvers and then to the zero g of orbit requires more advanced techniques.

Thus, this embodiment of the invention uses all of the previously described techniques associated with the aircraft structural integrity systems described above and modified techniques and hardware to produce a system which provides information on loads, fatigue lifetime, crack initiation and propogation, etc. suitable for evolution of structural integrity of space vehicle.

Figure 20:
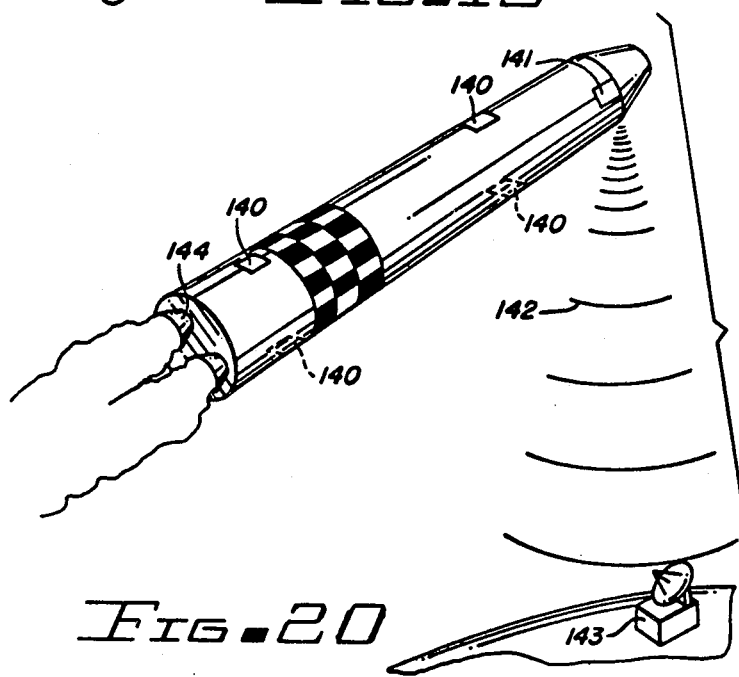
FIG. 20 depicts a typical implementation of the invention as used for assessing the structural integrity of space boosters.
Figure 21:
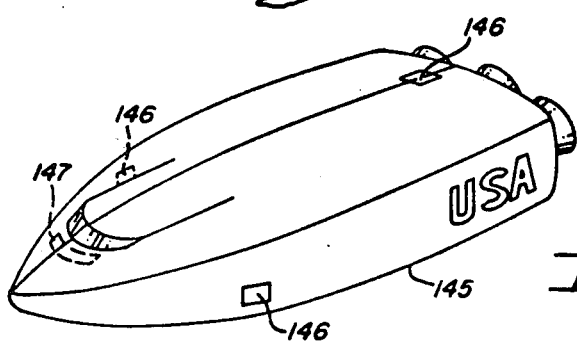
FIG. 21 depicts a typical implementation of the invention as used for assessing the structural integrity of spacecraft.

Implementations are illustrated in FIGS. 20 and 21.

FIG. 20 depicts a space booster implementation which includes the SMD sensors 140, strategically mounted on the booster structure, provides signals to the processing and display electronics 141. The processed signals 142 are provided by telemetry to ground stations 143 and command signals from the onboard processor 141 are provided to the active thrust controller 144 of the booster.

FIG. 21 depicts an implementation of the systems for assessing the structural integrity of the spacecraft 145 in which the sensors 146, strategically located, provide signals to the processing and display electronics 147 carried on board the spacecraft.

(b) Buildings

According to this embodiment of the invention, SMD systems, including associated signal processing and electronics, are used to assess the structural integrity of buildings.

The current technologies used in the design of buildings have been developed over a long period of time without the assistance of an active structural information feedback system. This has resulted in the incorporation of a "Factor of Safety" in the design philosophy in order to account for the uncertainties in predicting the ability to adequately withstand the design load. As a consequence of this practice, most buildings have an extreme amount of "over design" which is directly reflected in higher capital costs.

One of the reasons this practice evolved was the lack of an adequate and reliable structural load measurement sensor and concept that could directly determine the physical parameters of interest. In other disciplines, such as aircraft and spacecraft design, overdesign is unacceptable and structural analysis and laboratory testing techniques have been developed into a fine art in order to minimize the uncertainties and allow a "Factor of Safety" of near unity. In the past, because of excessively high costs, such analyses and laboratory testing have not been cost effective for the design of buildings.

According to this embodiment, it is now possible to provide an accurate measurement of the ability of any structure to carry its design load. This can be done both during laboratory testing and in the actual building in real time. This allows two new important concepts to be introduced in the industry and forms the basis of this embodiment of the invention.

First, this embodiment provides a continuous active measurement of the ability of the structure to carry both its actual and its design load. This permits assessment of structural capability before and after a potentially harmful major event, such as an earthquake. It also allows for the assessment of such capability during and after building construction and during the normal course of building operation. Secondly, this embodiment allows for the exact mathematical modeling and laboratory testing of scaled models of potential new designs. This laboratory testing permits the design of a building with a lower "Factor of Safety" with the associated significant reduction in initial capital and labor cost. In fact, such a cost-effective design can be verified when built by use of the active system measurements provided by the invention's measurement array.

The invention uses the SMD to directly measure a structural member's ability to carry a specific load (the flexural rigidity of the structure). The output of the SMD is $$O_{FRS} = \frac{1}{EI} f(\text{loading}) \, dx$$

where 1/EI is the effective flexural rigidity of the structure and f(loading) indicates the local bending moment due to the structural loading. Assessment of the structure's ability to carry its design load is accomplished by imposing known load (small relative to the design load) on the structure and using the output of the SMD to determine the flexural rigidity of the structure. Changes in the ability of the structure to carry the design load result in changes in 1/EI. This is then translated into an indication of the severeness of the change In this embodiment, the inverse of this operation will also be used. If IE is known, then the sensor output is directly related to the load. With appropriate processing, it is possible to frequently evaluate EI using autocorrelation techniques and use that value of EI to determine the existing load. Thus, knowing both load carrying capability and the load, it is possible to predict impending failure.

Figure 22:
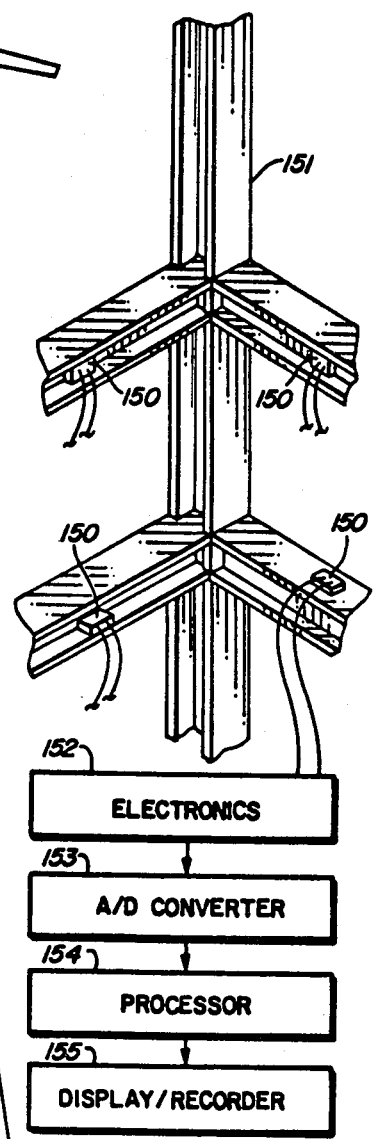
FIG. 22 depicts a system for assessing the structural integrity of buildings.

As shown in FIG. 22, according to this embodiment of the invention, the SMD sensors 150 are located at critical points throughout the building structure 151. The signals from the sensors 150 are then fed to the electronics 152, A-D converter 153, signal processor 154 and display/recorder components as previously described.

(c) Bridges

This embodiment of the invention provides a system for assessing the structural integrity of bridges.

The ability to detect deterioration in structural members prior to the deterioration affecting the integrity of the structure is of vital concern to the engineering community. For example, a major portion of the highway bridges built in this country are approaching their expected service lives. Visual inspection is the only inspection technique which is currently in general use. The obvious shortcomings of visual inspection has prompted the development of other non-destructive evaluation techniques. However, the techniques studied to date have primarily relied upon accelerometers to monitor the dynamic response of structures to in-services loads. Accelerometers respond to both the rigid body and the flexural motions of the structural member on which they are mounted. Therefore, the measured signal tends to mask changes in the structural signature resulting from changes in the flexural rigidity of the structural member.

The SMD is only sensitive to flexural motions. Since it discriminates between rigid body and angular motions in the dynamic response of a structural member, it is capable of accurately detecting changes in the flexural rigidity. Thus, this embodiment provides a non-destructive technique for evaluating the structural integrity of structures under actual field conditions This embodiment thus provides a systematic, automated, and reliable non-destructive method of monitoring the integrity of civil engineering structures under field conditions. The benefits of monitoring the performance of our aging bridge inventory is obvious both in terms of cost and potential savings in lives.

Figure 23:
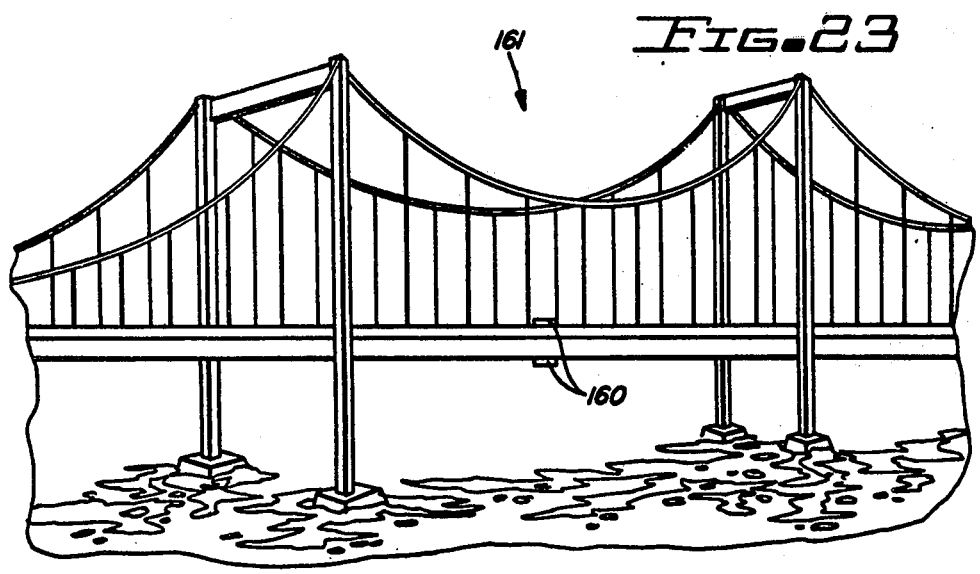
FIG. 23 depicts a system for assessing the structural integrity of bridges.

FIG. 23 illustrates an application of this embodiment. Structural moment detectors 160 are located on either the top or the bottom of the center span of a typical single span suspension bridge 161. For multiple span bridges, sensors 160 would be, likewise, located in the center of, and on either the top or bottom of, structural members of the other spans. As a cost effectiveness tradeoff, the electronics and signal processing package could be located at a central location or self-contained packages could be located at the center of each span. In any event, the electronics and signal processing hardware would be essentially the same as that disclosed in FIG. 4.

(d) Ocean-Going Vessels

This embodiment of the invention provides a system for assessing the structural integrity of ocean-going vessels.

Although the shipping industry ranks as one of the oldest means of transporting mass goods, ever-increasing demands have required the industry to push technology to its limits. One of the primary consequences in recent years has been the development and use of very large ocean-going vessels. Because of the extremely large capital investment represented by these vessels, the importance of the cargo, and the high costs associated with the accidental loss of the cargo or its delay in arriving, the potential benefits that could be gained by a real time assessment of the structural integrity of the vessel are quite significant. Within the U.S.A. technical environment, the Ships Structure Committee, American Bureau of Shipping, various sea shippers and technological industrial concerns have initiated numerous structural programs in order to acquire engineering design data which could be used to improve the design of large ocean-going vessels. Only within recent years have there been attempts to provide real time assessment of structures, none of which were ocean-going vessels. One of the major reasons for this has been the lack of adequate concepts and sensors that have the reliability and dependability required in the environment of intended use. With the development of the SMD and the associated electronics and processing techniques, it is now possible to provide a real time assessment of the ability of a structure to handle the load it is experiencing and provide an active indication of when this capability has changed.

Structural integrity assessment for ocean-going vessels consists of two distinct requirements; the structure itself and the propulsion system. With regard to the structure there are three basic objectives.

The first concept is the prediction of the load carrying capability of the structure. The unique measurement of the SMD permits a direct determination of the structure's flexural rigidity. Thus, if this determination is made and continuously compared with the design value, any change can be used as an indication of a potential structural problem and can be immediately inspected and evaluated. In this way the ability of the structure to carry its design loads can be continuously assessed.

The second objective for the structure itself involves the active detection of cracks. The energy released during formation and propagation of a crack excites frequencies within a structure which are detected by the SMD. With suitable processing of the signals from an array of sensors, the occurence, the location and the severity of the cracks are determined. This permits an assessment of their relationship to structural integrity.

The third objective involves the measurement and recording of the load history experienced by the ship structure. If this information is compared with the design environment an assessment of the remaining lifetime can be made.

With regard to structural integrity of the propulsion system, every machine has a characteristic vibration signature when it is operating properly. Changes in this signature can be used to predict failure and/or to provide warnings which permit maintenance and repair prior to failure. The SMD, associated electronics and processing are used in this fashion to assess the mechanical health of the propulsion systems.

Figure 24:
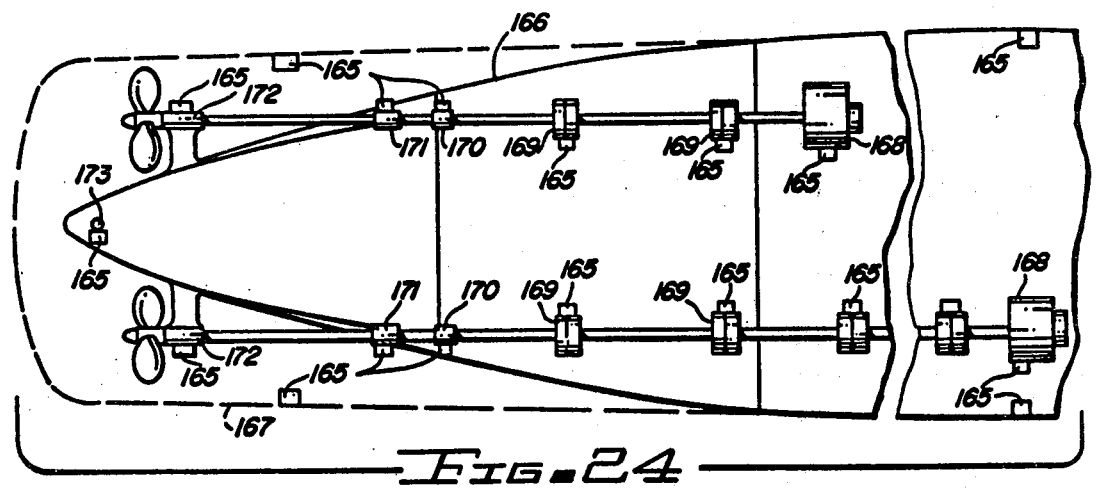
FIGS. 24-25 depict a system for assessing the structural integrity of cargo vessels.
Figure 25:
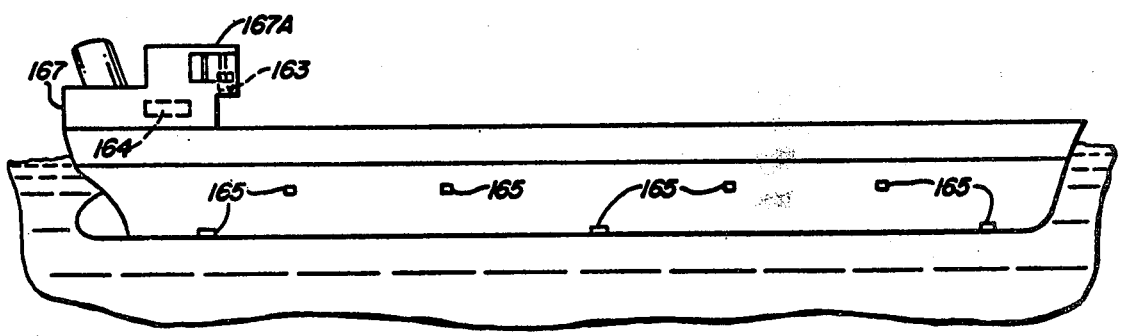

The invention consists of an array of SMD's, appropriate electronics, processors, recorders, and displays as depicted in FIGS. 24-25.

FIG. 24 depicts the layout of the propulsion system within the hull of a typical cargo vessel. Structural moment detectors 165 are attached at appropriate places to the underwater portion of the hull 166 as well as the superstructure 167. Additionally, structural moment detectors are attached to the engines 168, spring bearings 169, forward stern tube bearings 170, aft stern tube bearings 171, propeller strut bearings 172 and the rutter stock 173. As shown in FIG. 25 the output of the sensors 165, including those attached to the propulsion system components as shown in FIG. 24, is provided to the electronics and signal processing package 166 located in the deckhouse 167 which, in turn, provides processed signal information to the display package 168 on the bridge 169.

(e) Offshore Platforms

This embodiment of the invention provides a system for assessing the structural integrity of offshore platforms.

Offshore structures installed in hostile waters such as the North Sea, the China Sea, and the waters near Australia and New Zealand can be subjected to structural loadings far exceeding those experienced in the Gulf of Mexico. Several studies have dealt with the analysis and design of these structures for structural integrity (fatigue loading, earthquake loading, and wave loading). These efforts concentrate on determining the stress-concentration factors at the nodes of the frame structures. Such efforts result mainly in the structural design of offshore platforms with large safety factors for structural fatigue. Little, if any, effort is expended to determine real time estimates of the structural forces or the ability of the structure to continue to carry its load when the platform is in use. If a system for obtaining such estimates were available, the estimates could be used to provide design feedback to the structural design process, real time assessment of the structural integrity, and advanced warning of incipient failure.

The primary reason for the absence of such a system is the lack of reliable, accurate instruments and associated components to provide the structural information necessary for assessment of structural integrity. The most recent attempt in this area uses acoustic detectors that quantitize the acoustic energy levels. Unfortunately, these systems have high equipment costs, low production yields, and marginal fire risks. In addition, they measure a physical parameter that is not directly related to structural integrity.

Offshore platform structural integrity assessment involves at least three basic objectives. The first objective is an assessment of the remaining fatigue lifetime the structure possesses. If the initial distribution of flaws is known or assumed from statistical information; and information relative to critical crack lengths, crack growth mechanisms; etc. is known (or assumed from statistical information), then if the load history applied to the structure is measured, an estimate can be made of the remaining fatigue lifetime. This can also be accomplished through interpretation of the changes in natural frequency of the structural members or through direct measurements of flexural rigidity.

The second objective is to measure failure mechanisms in the structure itself. If cracks are detected as they occur, and if one acquires information on crack growth in real time on the structure, then an assessment of the severity of a crack can be made as it occurs.

The third objective is simply to observe the point at which the structure exceeds its design loads. For loads above some limiting value, inspections are required. This invention addresses all three of these concepts.

The structural moment detector directly measures the flexural rigidity (1/EI) of the member on which it is mounted. Hence, the measurement is a direct measure of the ability of the structure to carry its load or a design load. When used in a dynamic measurement mode, the SMD can provide a direct measurement of the natural frequency of the structure to which it is mounted. This allows for a direct measurement of incipient buckling (natural frequency approaching zero) or a measurement of tension fracture (natural frequency increasing above specified limit). In addition, appropriate signal processing equipment provides a direct measurement of the structural transfer function between multiple points of the structure allowing for the identification of changing structural characteristics.

Thus, this embodiment of the invention will provide for monitoring the condition of the structure in real time, continuously, with a permanent record and a prediction of the remaining lifetime of the structure.

The system replaces as many conventional sensor systems as possible and thus standardize the various instrumentation systems currently utilized.

The information provided by this system will provide:

1. Failure Detection and Warning
2. Determination of Load Bearing Capability of Structural Members
3. The Detection and Location of Remote Cracks
4. Design Criteria and Validation Because of the unique environment and structural requirements of offshore platforms, this embodiment of the invention also has the following characteristics:

1. Unambiguous warning of structural failure.
2. Automatic monitoring techniques not requiring access.
3. Reliable operation under the most severe loading (weather) conditions.
4. Non-interference with normal operations.
5. Minimization of undersea installation, inspection, maintenance and repair.

Referring to FIG. 26, these characteristics are provided by attaching an array of sensors 170 to the platform 172 above the waterline 171. These sensors 170 are coupled with an electronics-data processing-display package 173 to enable the system to detect and locate crack initiation and propogation despite a random noise environment. The noise rejection or discrimination is provided by adaptive digital filtering techniques.

(f) Dams

This embodiment of the invention provides a system for assessing the structural integrity of dams.

More specifically, for earthen dams the system consists of a plethora of SMDs mounted on rectangular diaphragms and imbedded in the dam. The output of the SMD in this configuration is a direct measurement of soil pressure. Thus, any change can be interpreted in terms of the depth of water behind the dam. This information is then assessed for structural integrity.

For existing concrete dams SMDs are mounted on the water side of the dam. The output is directly related to the flexural rigidity of structure and therefore the load carrying capability of the dam. In this configuration the output is also monitored for seismic pulses indicative of crack initiation and/or settling.

For new concrete dams SMDs are mounted internally on reinforcing steel at critical locations of the dam One mode of implementation is depicted in FIG. 27. Diaphragm mounted SMDs 181 are positioned in the earth and standard SMDs 182 are positioned on the concrete center wall. The sensor outputs are fed to the electronics, microprocessor module 183 and processed according to preprogrammed instruction. The data is then appropriately recorded and/or displayed for interpretation.

(g) Pipelines

This embodiment of the invention relates to systems for examining and assessing the structural integrity of pipelines and determining the existence and location of flaws In recent years weld failures on gas distribution pipelines have emphasized the need to have inspection techniques to locate major flaws in high stress regions of pipeline systems. Current inspection techniques involve acoustic emission. In one technique 30 kh resonant vertical sensitive piezioelectric accelerometers mounted above ground on 1.6 cm diameter steel rods with hardened tips which contact the buried pipe were used to sense acoustic emission caused by loading the pipe by driving heavy vehicles across it. Sensors were required approximately every 61 meters. In another technique an electro mechanical pig is inserted in the pipeline and carried along by the fluid. The pig sends signals through the pipe and records reflections from flaws. Both methods are extremely time consuming and expensive.

The present invention mounts SMDs along the pipeline. The distance between sensors is 100 yards to 2000 yards. The system uses both DC and AC characteristic of the SMD. In the DC mode the SMD measures the flexural rigidity of the pipeline. A change in flexural rigidity indicates the existence of flaws and shows that a more detailed inspection is appropriate. In the AC mode the SMD detects seismic energy propagated through the pipe as the result of crack initiation and growth. Time of arrival at sensors on either side of the crack is used to determine location. Implementation of the system system is illustrated in FIG. 28.

A crack 191 causes seismic energy 192 to propogate along the pipe 193. The signal reaches SMD 194 first and later SMD 195. The information is sensed and then processed and recorded by the electronics and microprocessor package 196 co-located with each sensor. Final processing and crack location is accomplished after data collection from each sensor location. This may be done manually or by hand wiring each sensor package to a central computer.

If the pipeline is subjected to a known heavy load, for example, by placing a loaded heavy truck at predetermined points along the pipeline, the sensor output can be used to determine flexural rigidity of the pipeline. Any change in this value during subsequent tests would indicate a change in the ability of the pipeline to carry that load and hence a potential flaw.

This invention improves the current technology by:
(1) permitting increased distance between sensors
(2) extending the frequency band to 0-50 KHz
(3) making unique measurements of flexural rigidity
(4) providing active crack detection.

In addition, the SMD systems may be used to measure the stress in the pipeline resulting from shifts in the covering and supporting soil which may occur due to floods, earthquakes, etc. This provides a direct method of assessing the effects of fortuitous events on pipeline integrity.

(h) Land Vehicles

This embodiment of the invention relates to systems for assessing the structural integrity of land vehicles, including automobiles, trucks, tracked vehicles, heavy construction and mining vehicles, military vehicles, etc.

The system provides information concerning structural fatigue, active crack detection, overload conditions, load history, and vibration for the purpose of assessing: (a) the structural loads on the vehicle, (b) the remaining lifetime of the vehicle, (c) the conditions of components of the vehicle, (d) the operational history of the vehicle and (e) the current ability of the vehicle to carry its design loads and/or for providing more effective and efficient maintenance and/or test procedures.

The ultimate function of this system is to prevent catastrophic structural failure of a vehicle through structural integrity assessment.

Structural integrity assessment involves at least three basic objectives. The first is an assessment of the remaining fatigue lifetime the structure possesses.

The second objective relates to the occurrence of failure mechanisms in the structure itself. If cracks can be detected as they occur, it is possible to acquire information on crack growth in real time on the vehicle.

The third objective is simply to observe the point at which the vehicle exceeds its designed loads. For loads above some limiting value, inspections are required.

Referring to FIG. 29, the system as presently constituted consists of a number of SMDs 201 mounted at selected locations and properly oriented to be sensitive to the selected parameter to be measured. The SMDs 201 are connected through cabling 202 to the processing electronics (signal processing and buffering, A-to-D conversion, data processing, data recording and editing) package 203 and the output suitably displayed 204. The system functions by taking the unique measurements of the SMD and interpreting the output signals The system performs the following functions:
Monitor structural cracks as they occur
Assess the remaining fatigue lifetime of a structure
Warn of impending failure of structures approaching design loads
Warn of impending engine and/or component machinery failure.

(i) Pressure Vessels

This embodiment of the invention provides a system for detecting the existence and location of flaws in pressure vessels such as, for example, liquid natural gas tanks.

Figure 30:
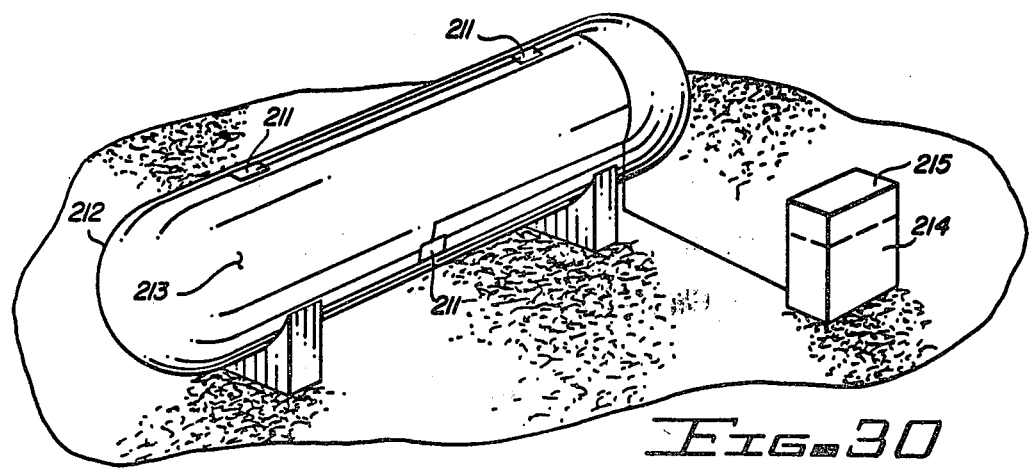
FIG. 30 depicts a system for assessing the structural integrity of pressure vessels.

The initiation and growth of cracks in a pressure vessel is accompanied by a release of strain energy. This energy propogates through the material in much the same way that sound travels through the atmosphere. Properly mounted and tuned SMDs can detect the energy as it reaches the SMD locations. In the embodiment illustrated in FIG. 30, a plurality of SMDs 211 are located on the surface of the LNG tank 212. The flaw 213 emits energy which is detected by the SMDs 211. The time of arrival is different at each SMD. Using time of arrival and pulse propogation speed, the processor 214 determines the location and severily of the flaw 213. This information is recorded and suitably displayed 215 for later interpretation.

(j) Railways

This embodiment of the invention relates to a system for assessing the structural integrity of railroad car wheels and railroad rails.

The system measures the vibration signature generated by the relative movement between the metal wheels and rails of railway systems, compares the generated signature with that observed when rails, wheels and undercarriage are known to be structurally sound and interprets the difference to assess the structural integrity.

Figure 31:
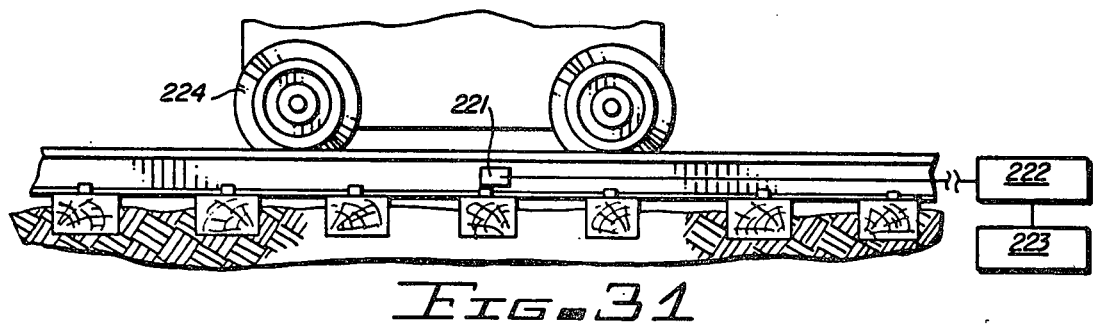
FIGS. 31-32 depict a system for assessing the structural integrity of railways.

In another mode of operation, the system measures the vibration signature which results from actively striking the wheels, rails, or undercarriage with a hammer or other device and compares the signatures as before The system consists of the SMD sensors suitably located and associated electronics, A-D converters, microprocessors, recorders and displays. These may be located at large distances (up to 1 mile) along the rails or may be attached to individual undercarriages (trucks) or near individual wheels One embodiment of this system is shown in FIG. 31. SMDs 221 are attached to the rails and monitor the vibration which is generated by each wheel 224 as it passes. The electronics and processing package 222 counts the wheels, and the display/signaling package 223 indicates and records any wheel which produces a vibration signature revealing a flaw.

Figure 32:
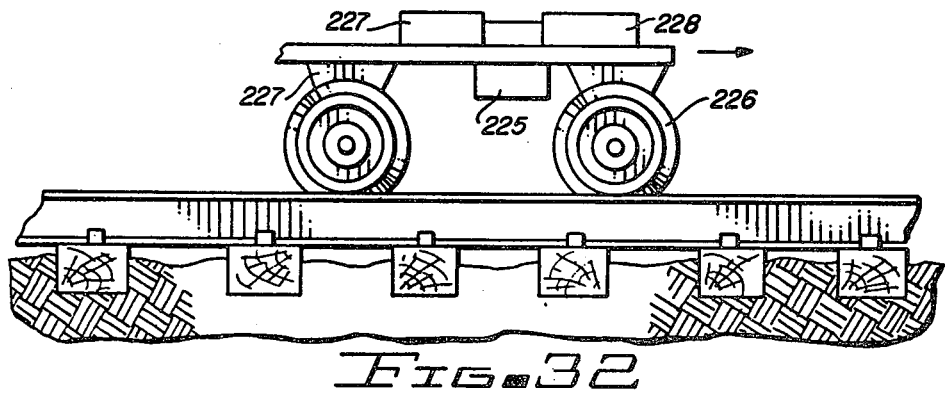
Figure 32A:
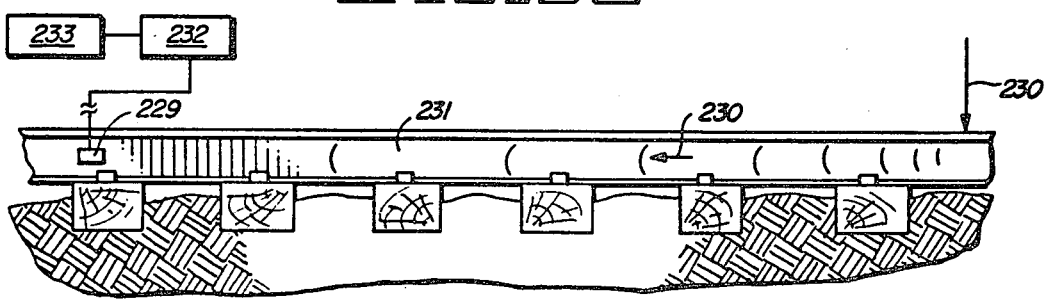

Another embodiment of this system is presented in FIG. 32. SMDs 225 are mounted on each individual truck and continuously monitor the vibration signature of the wheels 226 mounted on the truck 227. The signals from the SMDs 225 can either be fed to electronics/processing packages 227 or display/signaling devices 228 mounted on each truck, or the packages 227/228 can be centrally located to monitor the output of a plurality of sensors 225 and generate appropriate alarm signals indicating the need for closer inspection.

A third implementation of this system is depicted in FIG. 33. SMDs 229 are attached to the tracks and used to detect the vibration signature of seismic energy propogating through the rails as a result of a calibrated impulse 230 applied to the rail 231. Significant changes in the output of the SMD 229 are sensed by the electronics/processor package 232 and displayed 233.

APPLIED STRUCTURAL MEASUREMENT SYSTEMS

In addition to performing basic measurements and assessing the integrity of various structures, described above, the SMDs are provided, in accordance with yet another aspect of the invention, in systems which utilize components of a building structure itself to effect communications and systems which indicate the status of certain portions of a building such as, for example, unauthorized entry into a building or portions thereof by an intruder.

Building Intrusion Alarm System

This embodiment of the invention provides intrusion alarm systems for detecting entry of unauthorized persons into a defined secure area within a building structure.

These intrusion alarm systems employ a structural moment detector to generate intrusion signals which are transmitted to a control center where the alarm signals are initiated.

The function of an intrusion alarm system is to detect an unauthorized entry into a defined secure area and to transmit this information to a specific control point. Specific advantageous characteristics of a security system are the ability to differentiate between human intruders and a potentially harmless intruder such as an animal; the ability to minimize the number of false alarms; the ability to prevent an override or bypass; and the ability to operate during adverse environmental conditions such as power failure, electrical storms, and prolonged temperature variations. The security system can be considered to consist of three basic subsystems (1) intrusion sensor; (2) the control center; and (3) local and remote security systems.

Intrusion sensors are classified as either perimeter detectors or volumetric space detectors Perimeter intrusion sensors essentially consist of different types of switches, such as the common magnetic switch, which are strategically located around the perimeter of the region to be secured. The other three most common perimeter devices are the mat switch, the metallic window foil, and the perimeter light beam. A more sophisticated perimeter intrusion sensor is the vibration switch which provides a signal when strong structural vibrations, such as hammering or sawing, are occurring. The most common disadvantages associated with the perimeter intrusion sensors are the fact that the devices are basically one or two dimensional and do not sense the entire volume to be secured, the sensors are quite easily "jumped" electrically, and they usually require considerable wiring to implement.

The space intrusion sensor is designed to detect a violation of a volumetrical region. The basic principle of operation of prior art space intrusion sensors includes the generation and transmission of a stable energy filed throughout the volume which when disturbed by the entry of a human, causes a receiving device to generate an alarm signal Such devices have a degree of invulnerability since one must pass through the secure area in order to come in physical contact with the equipment. Most of the volumetric intrusion sensors employ the physical principle known as the Doppler Shift. A large number of sensors have been developed which operate in various segments of the acoustic and electromagnetic spectrum. Some examples are:

(1) Acoustic sensors operating in the region of 4,000 to 8,000 Hz.

(2) Ultrasonic devices operating in the region of 15,000 to 40,000 Hz.

(3) Ultrahigh electromagnetic frequency devices operating at 915 megahertz, basically a microwave device.

(4) Microwave devices operating at 2.5 to 10 giga hertz.

Table 1 provides some information on prior art space intrusion sensors.

TABLE 1

| PRIOR ART SPACE INTRUSION SENSORS | | | |
|---|---|---|---|
| Sensor Type | Method of Operation | Range of Operation | Comments |
| Audio Detection | Listens to sounds | 25 ft. radius | Blocked by walls, triggered by extraneous noises |
| Sonic | 4,000 to 9,000 Hz transmitted and received Doppler Signal | 25 ft. radius | Blocked by solid objects, triggered by moving objects |
| Ultrasonic | 15,000 to 40,000 Hz. | 15–30 ft. radius | Same as sonic |
| Microwave | 915 HHz, transmitted and received Doppler Signal | 20 ft. radius | Will go through walls, blocked by metal, may trigger on extraneous radio transmissions, FCC certification required |
| Microwave | 2.5–10 giga hertz transmitted and received Doppler Signal | Up to 75 ft. | Go through most solids, interface with commercial radar systems, may be used outdoors |
| Infrared | Passive detector sensing heat changes | 15 ft. radius | Will not sense through solids, triggered on hot spots (sun, etc.) |
| Stress | Resistive changes resulting from flexure in structural members | 15 ft. radius | Sensor mounted to structural members, less affected by extraneous noise sources |
| Capacity | Senses changed capacity in a tuned circuit | 2 ft. radius | Excellent short-range detection |
| Ambient Light | Light levels detected by photovoltaic cells | 10 ft. radius | Requires lighted area not subject to changes in outside ambient light levels |
| Closed Circuit TV | TV camera system | 50 ft. radius | Requires human observer |
| Seismic | Low frequency ground vibration | 50 ft. radius | Outdoor use primarily, may be triggered by environmental earth noise. |

It is possible to use the other intrusion characteristics of matter such as charge, mass, reflectivity, and weight to construct a sensor. In all cases, the prior art space intrusion sensors either generate a field or sense the energy field generated by the intruder. In general, the range of these sensors have been such that numerous sensors had to be employed to cover reasonably sized protected areas.

One of the major problems with any security system is the minimization of false alarms. False alarms can be generated by a wide variety of causes depending upon the operational mode of the detector. In order to attempt to minimize and eliminate false alarms, space intrusion detectors usually employ sophisticated electronic circuitry to process the basic intrusion signals received from the detector prior to giving an alarm signal. Such processing can take several forms. In Doppler systems, a velocity gate is sometimes employed which ignores all objects which are travelling at an extremely high or low rate of speed. Also, circuits which employ integration or event counting circuitry also help to reduce the possibility of false alarms. However, space intrusion detectors have a higher false alarm rate in general, due to the more sophisticated technology used.

In some cases, the signal detection and classification is not done at the locality of the sensor, but is done at the central location of the control center. This is especially true when the control center has some capability of performing decisions such as a small computer or microprocessor. The primary function of the control center is to take the alarm signal and activate the necessary alarms and initiate the series of actions which must be taken in case the secure area is violated.

Once an intrusion has been detected by a sensor and processed by the control center, it is necessary to activate alarms which indicate that the intrusion is in progress and it is necessary to activate other security systems located in the secure area such as audible alarms, automatic door locking mechanisms, lights, disabling gas injecting systems, etc.

Transmission of the intrusion signals from the secure area to the control center and transmission of the alarm signals from the control center back to the secure area to activate security systems therein is usually accomplished via electrical wiring communicating between the intrusion sensors and the alarm center and between the alarm center and the security systems. Such prior art communications between the alarm system components are often vulnerable to various disabling techniques and are, themselves, the source of possible false alarms.

It would be highly advantageous to provide improved intrusion alarm systems in which the intrusion sensors have improved range, selectivity, reliability, and reduced tendency to generate false intrusion signals.

Additionally, it would be highly advantageous to provide intrusion alarm systems in which the communications between the alarm system components are accomplished by means less vulnerable to tampering and which themselves have a reduced tendency to generate false intrusion or alarm signals.

Accordingly, it is a principal object of the present invention to provide improved intrusion alarm systems.

Another object of the invention is to provide improved intrusion alarm systems which employ intrusion detectors of improved range, selectivity, reliability, and reduced tendency to generate false intrusion signals.

Yet another object of the invention is to provide improved intrusion alarm systems in which communications between the components of the system are less vulnerable to tampering and have a reduced tendency to generate false signals.

These and other, further and more specific objects and advantages of the invention will be apparent to those skilled in the art from the following detailed description thereof, taken in conjunction with the drawings, in which:

FIG. 33 is a schematic diagram illustrating the operation of intrusion alarm systems embodying the present invention.

Briefly, in accordance with this embodiment of our invention, we provide an intrusion alarm-security system for detecting unauthorized entry of persons into a defined secure area within a building structure. Signals are generated in response to an intrusion to activate security systems in response to the intrusion signals. Our system comprises at least one structural moment detector carried by a structural component of the building located within the secure area. The structural moment detector generates intrusion signals in response to the deflection of the structural member which is induced by changes of the loading on the member caused by an intrusion. Means are provided for transmitting the intrusion signals to a control center and means are provided in the control center for receiving the intrusion signals and for generating security system activation signals in response to the intrusion signals.

The operation and location of components of an intrusion alarm system incorporating the principles of the various preferred embodiments thereof are schematically depicted by FIG. 33. As shown, a secure area 30 may contain a plurality of structural moment detectors (SMD's) 31 attached to various structural components of the building structure 32. The electrical outputs 33 of the SMD's 31 can be directly transmitted to the control center 34 or, in accordance with the preferred embodiment of the invention, the outputs 33 of the SMD's 31 are supplied to transducers 35 which convert the electrical intrusion signals 33 to mechanical forces 36 which are applied directly to the building structure and the resultant mechanical intrusion signals 37 are transmitted through the building structure 32 to the control center 34 where they are received by one or more SMD's 38 which produce secondary intrusion signals 39 which are transmitted to appropriate signal processing equipment 40.

The signal processing equipment 40 processes the secondary intrusion signals 39 in accordance with art-recognized techniques to reject spurious signals and to perform other signal-processing steps, such as time-of-arrival analysis to indicate the point of intrusion, comparison of footprint "signature" of the intruder with footprint signatures of authorized personnel to determine whether the intrusion is unauthorized, etc. Upon identification of secondary intrusion signals 39 as ligitimate and unauthorized, the signal-processing equipment generates alarm signals 42 which are transmitted to alarm-activation equipment 43. The alarm-activation equipment activates various control center alarms and systems 44, various external alarms and systems 45 and various local security systems 46 located in the secure area 30. The activation signals 43a from the alarm activation equipment 43 can be transmitted electrically, directly to the local security systems 46 in the secure area 30 according to conventional prior art techniques. However, in accordance with a presently preferred embodiment of the invention, the activation signals 43a are applied to appropriate transducers 7 and converted to mechanical forces which are applied to the building structure 32 and transmitted therethrough as mechanical activation signals 48 which are received by activation signal receivers (SMD's) 49 located within the secure area 30, the output 50 of which is transmitted to and activates the local security systems 46 in the secure area 30.

As will be appreciated by those skilled in the art, the use of structural moment detectors as intrusion sensors provides significant advantages over conventional intrusion detector systems. Additionally, by coupling the sensors and the control center with transducers and additional structural moment detector devices, the intrusion signals and activation signals can be transmitted between the system components without the necessity of wires or an electronic field.

Another Building Structural Communication System

According to this embodiment of the invention, systems are provided for communicating between various parts of a building, using the building structure itself as the communications path. The communication function, according to this embodiment of the invention, is accomplished by a coded mechanical impulse to the building structure, transmitting the coded impulse through the structure to a remote location in another part of the building and applying a structural moment detector to detect the deflection of the structure caused by the coded impulse. The output signal from the structural moment detector is then processed to display and/or record the information contents of the signal For example, this embodiment of the invention can be used to effect two-way communication between the secure area and the control center components of the building intrusion alarm system described above, thus securely transmitting intrusion signals through the building structure itself to the central control point and securely transmitting signals back to the secure area from the control point to activate system components such as automatic door locking mechanisms, lights, audible alarms, disabling gas injecting systems, etc., all shown in FIG. 33.

APPLIED LOAD MEASUREMENT SYSTEMS

According to yet another aspect of the invention, SMDs are employed in systems for measuring the loads applied to various man-made and natural structures.

Vehicle Weight and Balance System

According to this embodiment of the invention, a system is provided which furnishes a real-time indication of the gross weight and location of the center of gravity of cargo and/or passenger vehicles of all types. While the following description illustrates the use of systems of this embodiment to measure gross weight and center of gravity of a cargo aircraft, the same system is applicable to all other vehicles such as cargo trucks, cargo and passenger ships, etc.

The air freight business is one of the primary sectors of the aviation industry. With each year, the number of air miles primarily flown for freight purposes increases significantly. Within the air freight operations, a primary task is the proper loading of the aircraft. In order to make optimum use of the payload capability and to ensure the safe operation of the aircraft, a precise knowledge of the total take-off gross weight (TOGW) and the location of the center of gravity must be determined.

Currently, this information is obtained by a nominally slow process of manual weighing and analytical calculation. Each container is manually weighed separately with the weight data being entered on a data sheet. Upon completion of all weighing and loading of the freight into the aircraft, the center of gravity is calculated. This method is subject to the typical errors of many similar computational processes, the most common being data misentry and mathematical errors in calculations.

There have been attempts to automate this process. These systems, however, apparently did not succeed due primarily to the difficulties in the method by which the distributed weight of the aircraft was measured. Fluidic pressure sensors located in the landing gear were subject to hysteresis and dead band nonlinearities Hence, the system was not affective and has not been used operationally.

In a manner comparable to past systems, the system of the present invention is designed to automatically weigh a loaded aircraft without scales as well as to automatically determine the location of the center of gravity The system consists of two main subsystems: (1) weight transducers (SMDs) which are mounted on the structure near the weight support subsystem and (2) an indicator control box which is mounted on the vehicle control panel. The function of the system as applied to air cargo aircraft is to calculate in real time not only the aircraft take-off gross weight (TOGW) but also the center of gravity of the aircraft in terms of percent mean aerodynamic chord (%MAC) or its lateral position.

Referring to FIG. 34, the components of the vehicle weight and balance system of the present embodiment of this invention consist of structural moment detectors 201 mounted on or near each of the landing gear struts, and electronics-microprocessor package 202 which receives and processes the signals from the structural moment detectors 201 and indicator/recorder 203 which displays and/or records the processed data from the electronics-microprocessor package 202.

The system of FIG. 34 functions as follows:

In modern aircraft, the landing gear forms a weight support system in which the supports are located at the apexes of a triangle The total aircraft weight is distributed at these three points in some unknown manner. The two parameters which must be determined are the total weight, and center of gravity in terms of the percent of the mean aerodynamic cord. The total weight calculation is the simple sum of the weights at each of the three points, i.e.:

$$TOGW = \sum_{i=1}^{3} W_i \quad (1)$$

where (1)

$W_i$ are the indicated weights at each of the three stations properly adjusted for unsprung weight The center of gravity can vary in all three spatial directions. However, the geometry of the situation and the means of loading the aircraft and the method by which it is controlled require that the primary direction of the center of gravity which is of interest is the motion along the longitudinal axis of the aircraft (roll axis). Using the weight distribution, the unknown center of gravity location can be determined by the simple moment equilibrium equation about the center of gravity, i.e.

$$x_{c.g.} = d_m - d_t \frac{W_N}{W} \quad (2)$$

where (see FIG. 35) (2)

$x_{c.g.}$ is the location of the center of gravity in terms of mean aerodynamic cord.

$d_m$ is the distance of the main gear from the leading edge of the mean aerodynamic cord in units of mean aerodynamic cord.

$d_T$ is the total distance from the nose gear to the main gear in units of mean aerodynamic cord.

$W_N$ is the weight sensed at the nose gear properly adjusted for weight not seen by the sensor.

TOGW=W is the total weight of the aircraft

Relationships (1) and (2) are then the two calculations which have to be performed on the measured data in order to determine the total weight and the center of gravity location.

The high sensitivity and unique measurement afforded by the SMD make this system a marked improvement over previous concepts. The measurement itself is made without the need for the sophisticated electronics required for strain gage instrumentation. Also, since it is the structural deflection which is being sensed, the problems associated with fluid pressures, etc. are avoided.

Crane Load and Structural Assessment System

According to this embodiment of the invention, systems are provided for real-time measurement of the load on a crane and the assessment of its structural integrity.

A plurality of SMDs are physically mounted to a crane structure. Measurements from the SMDs are converted into digital data by the electronics and subsequently into useful information by the microprocessor. The information is then presented as a visual display and/or recorded and analyzed to provide a knowledge of the current loading of the crane and predicted lifetime and/or decreased safe loading levels resulting from structural fatigue. This information is used both as a primary source for real-time control of loading operations and for safety verification prevention of overloads In another mode of operation, the system senses the natural vibration signature of critical members of the crane structure and through adaptive filtering identifies significant changes. These changes are then examined to determine their cause and an assessment of the effect on structural integrity is made.

In yet another mode of operation, the sensor is used to detect the load and to feed this information automatically to the control system. Thus, for example, if an offshore platform crane is being used to unload a barge in rough sea and the sea swells cause the barge to drop rapidly while a load on deck is hooked to the crane cable, the system would release the cable and prevent the sudden jerk which could break the cable.

In yet another mode of operation, the system is used to sense the actual load history on the crane as a result of environmental factors (wind, ice, etc.). This information is subsequently used in design of similar crane emplacements and for updating emperical design formulas.

An yet another mode of operation, the system is used to actively detect the initiation and growth of cracks in the crane structure.

As illustrated in FIGS. 36, 37 and 38, structural moment detectors 211 are attached at critical points of the crane structure. The output of these detectors 211 is supplied to the electronics and data processing package 212 and the processed signals from the package 212 are fed to display/recorder 213.

Geophysical Exploration System

According to this embodiment of the invention, SMDs are used in systems for geophysical exploration.

The specific purpose of this embodiment is to provide the geophysical exploration community with a significantly improved seismic instrumentation system. The invention is not limited to a sensor which provides better seismic information but includes additional improvements in the data processing software which are made possible by the use of the SMD technology. The existing geophysical models used in seismic data processing and other portions of the current data processing techniques have evolved over a period of time and are the direct result of theoretical and empirical investigations. The seismic sensors with their varied characteristics have had direct impact on data processing construction. This invention is a seismological instrumentation system that provides the capabilities promised by "high resolution seismology".

The SMD seismometer replaces current systems. It has a greater reliability (no moving parts), a greater signal to noise ratio and provides measurement capabilities not found in conventional sensors.

As an example, a SMD system was taken to a well location which was to be fractured. It was mounted on a surface outcropping of rock by epoxying the sensor to the rock. This was to minimize the effects of horizontal, man-created disturbances (such as the pump trucks) while providing a clear indication of seismic information generated at depth. In fact, the system was not greatly affected by surface disturbances, and the output became saturated at the same time the fracture occurred (allowing for transmission time). This experiment provided a clear indication that it is possible to selectively detect seismic disturbances depending on the exact manner in which that disturbance affects the structure to which the SMD is mounted.

As another embodiment a structural mount is provided that is sensitive to the shear wave rather than the compression wave. This allows the construction of a downhole instrumentation system to provide an output proportional to the shear wave velocity at the location of the sensor which, in turn, is a direct function of the porosity of the medium.

In order to obtain a measurement for use in a "high resolution" seismological instrumentation system that provides a significant increase in capability over current technologies, the seismological sensor of the present invention is primarily sensitive to seismic information generated at depth and is quite insensitive to seismic information that is transmitted along the surface. This is in contrast to conventional sensors that sense acceleration regardless of the source. The invention uses the SMDs applied to an anisotropic structure where the stiffness of the structure in two directions can be made extremely high while the stiffness in the measurement can be made quite low. This allows alignment of the sensor to the directions from which the information is caught while rejecting other information and permit separation of pressure and shear waves.

Systems constructed in accordance with the present embodiment of the invention are generally similar to conventional systems which provide geophones, with the exception that the geophones are replaced by appropriately mounted SMD sensors 221, sensitive to the appropriate directions, as shown in FIG. 39. The signal processing electronics and data processing equipment, recording equipment, software and displays required to produce the desired seismic information from the SMD signals is contained in the instrument track 222.

APPLIED COMMUNICATION/DETECTION SYSTEMS

According to other embodiments of the invention, structural moment detectors are used in systems for detecting and communicating information.

Mechanical Health Monitoring System

According to this embodiment of the invention, systems are provided for monitoring the health of rotating, reciprocating and other moving machines having multiple components.

This invention as it applies to complex operating machines is based on the real time assessment of the "vibration signature" of the machine. Subsequently, this knowledge and information is applied to the design optimization of future machines as well as the prediction of the remaining lifetime of existing machines.

The concept of monitoring the vibration signature of a mechanical system for an indication of the mechanical health of the system is well established. Every operating mechanical system has a distinct vibration signature which is produced when the system is operating properly. When a malfunction occurs the signature changes. Appropriate observation and analysis of the vibration signature can therefore provide an early indication of the severity and location of possible trouble and can help to prevent costly catastrophic failure.

The actual vibration signature of a machine contains many frequencies. This is a result of different components vibrating at various discrete frequencies and various mechanical resonances and nonlinear combinations of those signals in the machine. The resultant signal at a measurement point is therefore a complex vibration wave form which is processed to reduce it to its discrete frequency components for analysis.

The monitoring system of this embodiment consists of sensors (vibration transducers), a signal processor (monitoring system) and suitable displays or alarm generating devices. Sensors commonly in use are the piezoelectric accelerometer and the inductive velocity transducer. While there is limited agreement on the specific crossover frequency, there is general agreement that vibration severity is proportional to velocity at relatively low frequencies and proportional to acceleration at high frequencies. Thus, the applications of the piezoelectric and velocity transducers are naturally separated by frequency. In addition, velocity transducers are generally rugged, operate over wide temperature ranges, produce relatively high signal to noise outputs, but are limited to about 1000 Hz. Piezoelectric accelerometers are more sensitive to contamination. Both have frequency ranges which are significantly influenced by the method of attachment to the machine.

Both the velocity transducer and the piezoelectric accelerometer respond to displacements perpendicular to their mounting surface. The SMD, however, measures the difference between planes perpendicular to the surface to which it is mounted, that is, the measurement motion is 90° to that of other sensors.

The significant point is not that suitable mountings will permit direct replacement of velocity transducers, strain gages and piezoelectric accelerometers. Rather, the significant point is that the SMD responds to transverse and longitudinal waves in a body which cause the surface to deflect as little as $3.5 \times 10^{-9}$ radians across the 1.5 inch length of the sensor (a surface displacement of $5.3 \times 10^{-3}$ microinches).

In the measurement of these ultra small deflections, the SMD has a frequency response which is essentially flat from 0 to 40 kHz. Combinations of velocity and acceleration sensors in the best VMS systems currently in use provide a flat response from 0 to 20 kHz only.

In addition to this extreme sensitivity and wide frequency response, the SMD is rugged and well-suited to field and plant use. It requires a minimum of electronics (standard buffer amplifiers and power supplies) to obtain a signal and it can be fabricated for less than $100. The SMD can also be fabricated to provide less sensitivity for less cost. The cost and sensitivity are design parameters and trade-off analyses are made for each application.

Thus, according to this embodiment of the invention, SMDs are not merely used to replace conventional sensors. Rather, a system is provided which, using the unique measurement provided by the SMD, analytically and experimentally correlates and makes understandable the measurement of and meaning of vibration and mechanical health of complex equipment.

Specifically, the invention:
1. Provides a warning if the structure approaches or exceeds operating limitations.
2. Permits better use of lightweight, efficient structural design. If pending failure can be predicted more accurately, design safety factors can be reduced. This translates to lower cost and higher performance.
3. Extends the life of existing systems. If the remaining fatigue life of a system can be more accurately defined, replacement can be delayed.
4. Provides "expert witness testimony." The recorded information positively establishes conditions prior to an incident or failure.

Figure 40:
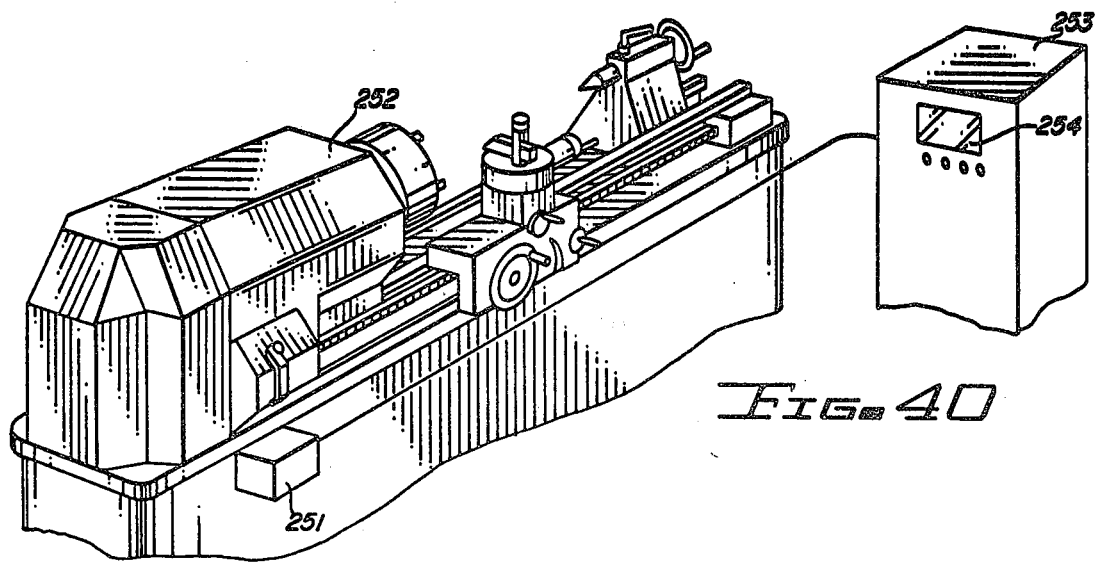
FIG. 40 depicts an embodiment of the invention used for monitoring the mechanical health of complex rotating or reciprocating machinery.

Referring to FIG. 40 which illustrates a typical application of the system of this embodiment of the invention, SMD sensors 251 are mounted at one or more locations on the frame of a complex machine such as the lathe 252 illustrated in FIG. 40. The output of the sensors 251 is fed to an electronics/data processing package 253 which is provided with appropriate data recorders 254 and displays.

Dynamic Vibration Simulation System

According to this embodiment of the invention, systems utilizing SMDs are provided which measure the actual vibration environment experienced by a device and reproduce that environment in the laboratory.

According to one example chosen for purposes of illustration, systems are provided for automobile road testing in which an SMD is mounted near each wheel and the automobile is provided with appropriate electronics/data processing/recording packages. The car is then driven over typical roads and the vibrational environment is recorded.

Figure 41:
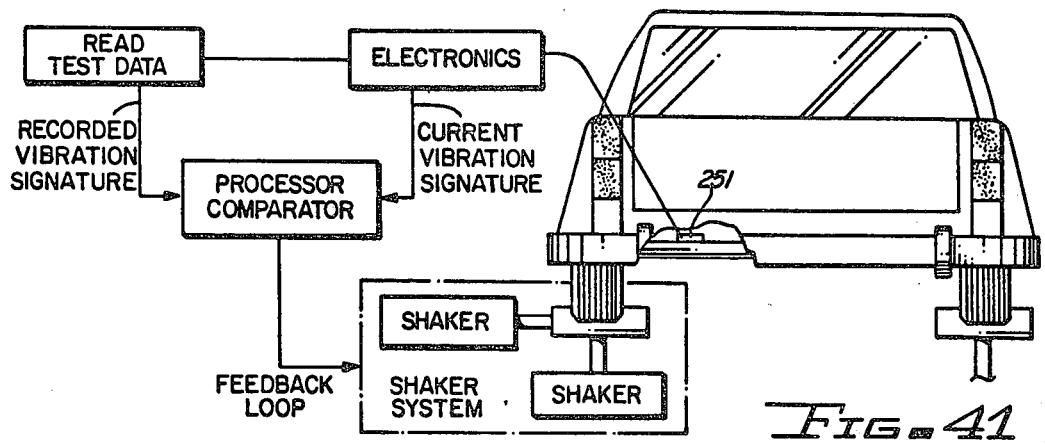
FIG. 41 depicts a system of the invention which is used for dynamic vibration simulation.

In the laboratory, the automobile is mounted on shaker tables capable of exercising each wheel in three dimensions as well as, if desired, rotating each wheel. The shaker tables are programmed to provide the vibration environment previously recorded. The SMDs, mounted as during the actual test, sense the actual vibration, compare the actual vibration with the recorded vibration data and the difference is fed back to the shaker table drive system. The drive system then alters its program to force the differences to zero, thus duplicating the actual recorded environment, as shown in FIG. 41.

Structural Navigation System

According to this embodiment of the invention, SMDs are employed in systems designed to measure the loads on an aircraft structure and infer aircraft attitude, velocity, acceleration and location.

The outputs of the SMDs are directly related to the deflection of the surfaces to which they are attached. These surfaces, such as the wing, tail and fuselage structures deflect as a result of the various forces applied to them such as lift, drag, thrust and the weight of the aircraft. In addition, forces are generated by the control surfaces when the aircraft's attitude is changed.

The aircraft can be considered to respond to Newton's laws of motion with six degrees of freedom. Thus if the forces and aircraft mass are known, acceleration is known. Velocity, position and attitude is then calculated by integration.

Aircraft weight is known at takeoff and fuel burned can be accounted for. Thus its mass is known. The SMD measurements are related to the forces so the forces can be calculated. Thus all the desired state variables can be determined.

Figure 42:
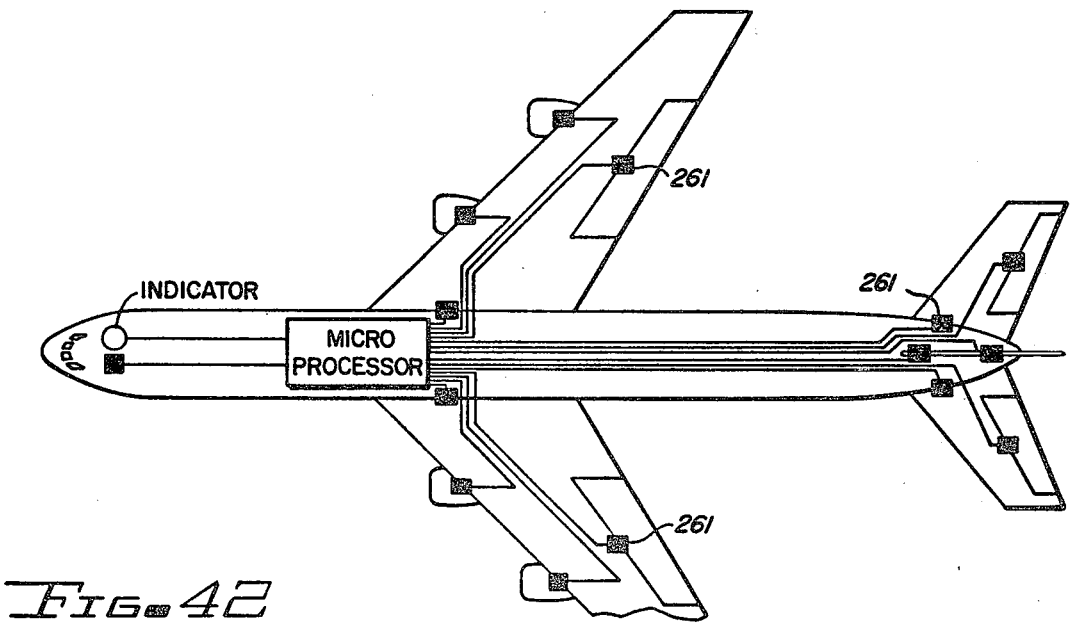
FIG. 42 depicts an embodiment of the invention which is used for aircraft navigation.

One embodiment is depicted in FIG. 42. The SMDs 261 are appropriately located to sense the needed forces. The signals are fed to the microprocessor 262. In the microprocessor 262 the forces, mass, etc. are used to calculate the desired state variables which are subsequently displayed 263.

Optical Platform Stabalization Systems

In this embodiment of the invention, SMDs are employed in systems for providing precise active alignment of optical systems such as interferometers, holographs, lasers, etc.

Extremely precise alignment of optical systems is a requirement for their effective operation. The use of massive and expensive optical benches is essential. In addition, environmental control must be exercised in order to minimize deflections resulting from temperature differences, moon tides, etc. Vehicle acceleration is also a problem in mobile systems.

This invention uses the SMD to sense minute deflections in the system. This information is then processed and fed to actuators which apply force to the structure and warp the surface to drive the SMD output back to the null position—thus correcting the misalignment.

Figure 43:
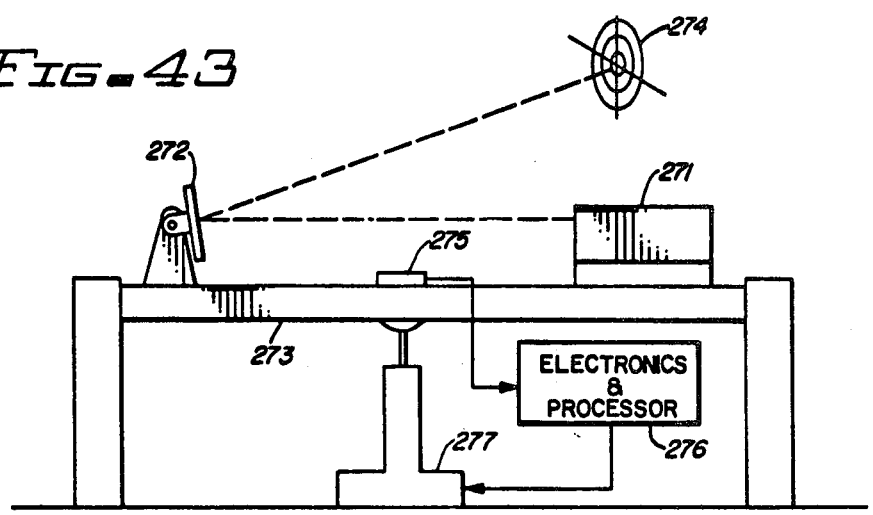
FIG. 43 depicts an embodiment of the invention which uses SMD systems for stabalizing optical platforms.

One implementation is indicated in FIG. 43. A laser 271 and mirror 272 are precisely mounted on the optical bench 273 so that the laser beam hits the center of the target 274. The SMD 275 is mounted on the optical bench 273 and registers zero output as long as the optical bench remains as aligned. When the optical bench deflects as a result of external influences, the SMD 275 senses the deflection. The SMD 275 signal is processed by the electronics 276 and fed to the actuator 277 which repositions the bench to drive the SMD signal back to zero output.

In accordance with another embodiment of the invention, SMDs are used in systems for precisely pointing laser beams in high rate-high density data storage retrieval systems.

In such systems, measurement of the order of $10^{-7}$ radians and pointing accuracies of similar magnitude are required. The major difficulty lies in the stabalization of the pointing mechanisms. The systems of the present invention, which include the SMD sensors having resolving powers of $10^{-9}$ radians, provide proper stabalization of the pointing system through use of optical angle measurement and feedback to the electronics/data processing package.

Strain Gage Replacement System

This embodiment of the invention provides a replacement for systems which normally apply strain gage sensors.

The SMD measures the deflection of two normals to the surface at the points where the SMD is attached. A strain gage responds to linear displacement, ie. strain. Thus, the two measurements are fundamentally different.

This invention is a device using the SMD in a manner such that the device can directly replace a strain gage and, at the same time, eliminate much of the sophisticated electronics associated with strain gage technology.

More specifically this invention consists of an SMD and a mounting structure designed to cause the device to respond to linear displacement. One implementation is shown in FIG. 44.

Figure 44:
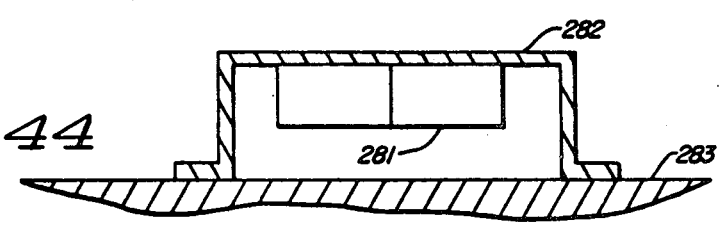
FIG. 44 depicts an embodiment of the invention in which SMD systems are used as replacements for conventional strain gages.

In FIG. 44 the SMD 281 is attached to a structural mount 282 which, in turn, is attached to a surface 283. The strain is to be measured. Tensile strain of the surface 283 causes the legs of the structural mount 282 to deflect outward applying a bending moment to the upper portion of the structural mount 282. This is sensed directly by the SMD 281 and calibrated to indicated strain.

This system improves strain gage technology by:
(1) sensing forces (strains) up to ten thousand times smaller than those of the best current strain gage;
(2) eliminating sophisticated electronics; and
(3) expanding the frequency band width (0-50 kh).

Voice Analyzing System

According to this embodiment of the invention, systems including SMDs are provided for analyzing voices for the purpose of identification.

The extreme sensitivity of the SMD and its wide frequency response are used to construct a microphone with essentially constant response over the complete audio/vocal range. The output from this microphone is then processed to produce the power spectral density of the signal which is used in a manner similar to an individual's finger prints.

Figure 45:
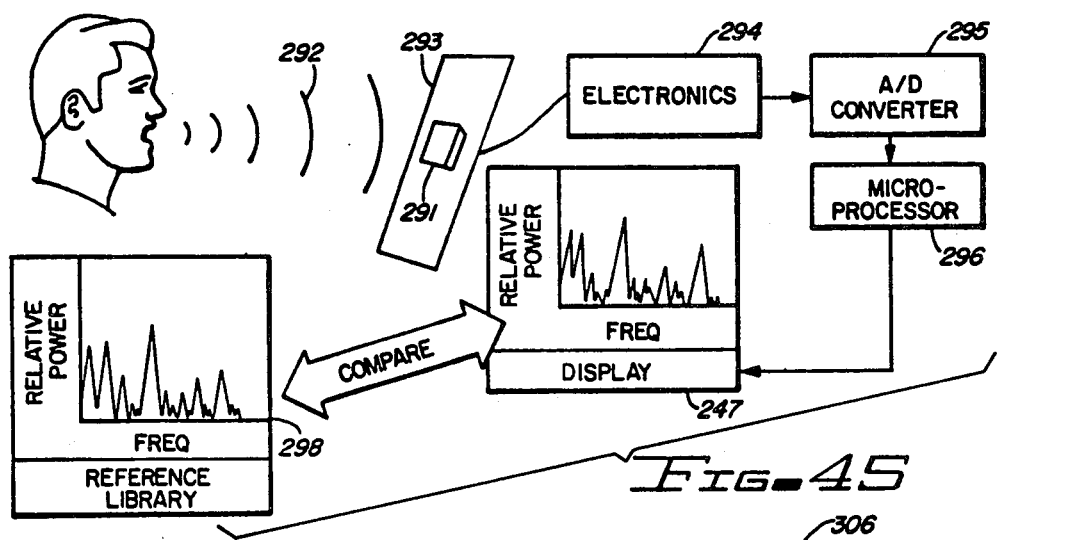
FIG. 45 depicts an embodiment of the invention utilized as a voice analyzing system.

In this embodiment of FIG. 45, the SMD 291 is mounted on a rectangular diaphragm 293 to make a super sensitive microphone. The voice 292 vibrates the diaphragm 293. The SMD 291 senses the vibrations. The output is fed through the electronics 294, A/D converter 295 and microprocessor 296. A Fast Fourier Transform (FFT) is used in the microprocessor 296 to produce the power spectral density (PSD) of the voice. This PSD is then displayed 297 and compared with similar displays from the reference library 298. If the PSDs match, the voices are the same.

Smoke Detector System

According to this embodiment of the invention, systems including SMDs are provided which detect smoke.

In this embodiment, the SMD case is modified to permit ambient air to circulate through the case and adds an electronic detection system to detect light scattered by the particles in this ambient air, specifically smoke particles.

Figure 46A:
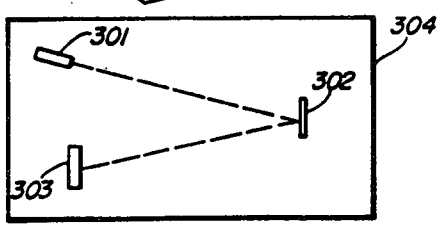
FIGS. 46A and B depicts an embodiment of the invention which is used as a smoke detector.

The implementation is illustrated in FIG. 46. In FIG. 46A the essential optics of the standard SMD are illustrated. Light emitted by the LED 301 is incident on the mirror 302 and reflected back to the photocells 303. The case 304, while not necessarily sealed, does not permit circulation of ambient air.

Figure 46B:
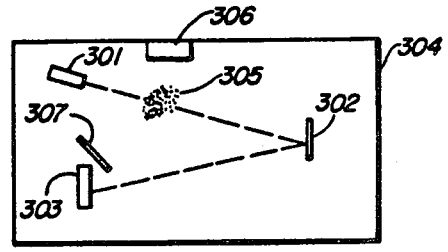

In FIG. 46B the case 304 is modified to permit ambient air to circulate freely through the SMD. A photocell detector 306 is installed in the side of the case 304. Again, light is emitted by the LED 301. However, a portion of this light is intercepted by the smoke particle 305 and scattered to the detector 306. This scattered light is interpreted to indicate the presence of smoke and an alarm is generated. Suitable baffles 307 are installed to shield the photocells 303 from scattered light.

Well Drilling Downhole Communications System

In this embodiment of the invention, systems which include SMDs are provided for communicating realtime data from the drilling bit of a well drilling rig to the surface for the purpose of improving drilling effectiveness in both exploration and production wells.

Rotary drilling has evolved as an efficient and effective means of exploring for hydrocarbon resources. During 1976, over $6 billion was spent to drill and complete over 40,000 wells in the United States alone. Recent emphasis on world energy requirements has brought deeper drilling, increased activity and higher costs for offshore drilling on the order of 5% per year. Hence, even a small improvement in drilling efficiency has a major economic impact on the drilling industry. Of the many possible methods to increase drilling efficiency, real-time data from the bit offers the greatest ootential to improve drilling effectiveness in both exploration and production wells.

The present embodiment provides a system which collects data automatically at or near the bottom of the well bore while drilling, and transmits the data to the surface at a high rate in real-time. This invention provides the technology to practically and economically obtain the real-time data required to drill most safely and economically.

There are two distinct measurement capabilities required of such a system. The highest priority is providing an estimate of those parameters which indicate the safety of the drilling operation and the efficiency of the drilling process. This information is usually further subdivided into well control, directional survey, and drilling optimization. The second priority is the real-time logging of formation evaluation information.

Most of the sensor technology required to make the downhole measurements has been developed to some degree and proven. In the early 1960's, others demonstrated the necessary sensor capability, but lacked a telemetry system using downhole recorders for a permanent record of the data. The data transmission subsystem of the system remained the unproven link and this system fills that function. There are currently in existence four types of telemetry systems:
Mud Pressure Pulse
Hard Wire Telemetry
Electromagnetic
Acoustic Each of these types of systems is under investigation by more than one company which indicates that a technical concensus as to the optimal method does not exist at this time.

The Mud Pressure Pulse System (MPP) changes the resistance to the flow of mud through the drill string, thus modulating the pressure in the mud. The pressure pulse (on the order of 50 psi) travels up the mud column at near the velocity of sound in the mud, about 4,000–5,000 ft/sec. Due to pulse spreading and modulating rate limitations, the rate of information transmission is relatively slow. The system has the slight disadvantage that it requires downhole power in order to modulate the mud pressure MPP systems are quite old, dating back to the 1930's in concept; and in use, to the 1950's and 1960's. Several companies are pursuing the advanced development of such a system.

The hard wire systems have the greatest potential of providing the maximum capability and are currently used for logging and other borehole operations. However, the operational problems associated with providing positive connection in pipe systems under drilling conditions and operational flexibility in separate wire systems have not met the requirements for a practical, economical and reliable system.

Transmission of electromagnetic signals, both through the earth and drill pipe, have been studied as a telemetry system for downhole measurements while drilling. Several government and industry-funded projects have been undertaken to develop operational systems. The principal advantages of the system would be a potentially higher data rate and elimination of special drill pipe. The disadvantages of the system are that the low frequency electromagnetic signals used are near telluric frequencies and the background noises are quite high making signal detection difficult if not nearly impossible. Practical implementation requires repeaters along the drill string which increases cost and decreases operational reliability.

The other potential method for borehole telemetry is transmission of acoustic or seismic signals through the drill pipe. In general, the very low intensity of the signal which can be generated downhole, along with the acoustic noise generated by the drilling system and the attenuation of the earth or drill string, makes signal detection at the surface difficult. Several systems are being developed and several different products are currently on the market. The primary advantages of acoustic systems are their simplicity and low cost. The disadvantage is the low signal-to-noise ratio of the information to be sensed.

Figure 47:
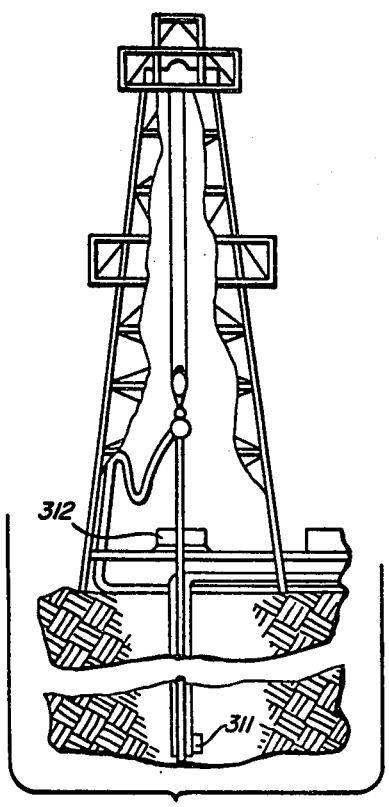
FIG. 47 depicts an embodiment of the invention used for downhole communication in well drilling operations.

Referring to FIG. 47, the present embodiment of the invention uses the SMD and associated electronics and processors as a sensor in a downhole communications device. Data is sensed downhole and converted to digital signals which are transmitted through the drill string as coded pulses by use of mechanical or electromechanical tappers. The pulses appear as vibrational energy in the drill string and are sensed, along with all the background noise associated with drilling, by the SMD 311. The transmitted information arrives at the surface with an extremely low signal-to-noise ratio. Processing 312 to acquire the information uses adaptive digital filtering and signal component Fourier estimation techniques. The decoded pulses provide the desired information.

Earthquake Detection System

According to this embodiment of the invention, systems including SMDs are provided for predicting and/or detecting earthquakes.

The invention uses the SMD to produce seismometers capable of responding to the high frequency ($\sim 1/6$ Uz) and very low frequency ($\sim 1$ per 10 minutes) waves characteristic of very early stages of earthquake activity.

Figure 48:
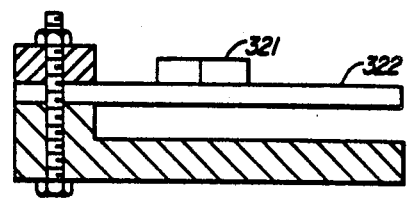
FIGS. 48-49 depict embodiments of the invention which are used for earthquake detection.

In one mode of application (see FIG. 48) this invention uses the SMD 321 mounted on a cantilevered beam 322. The dimensions of the beam are chosen such that the beam is tuned to the frequency of interest. Vibrations are amplified by the beam and sensed by the SMD.

Figure 49:
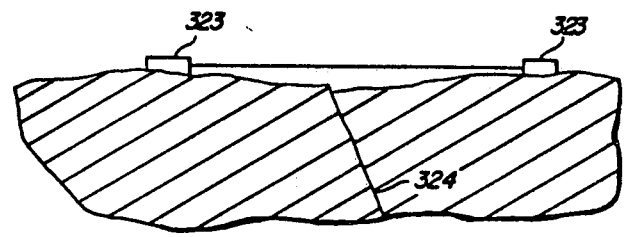

In another mode shown in FIG. 49, SMDs 323 are mounted on the surface of rocks near a known fault line. In this application the standard SMD is modified to have its optical path length across the fault. In essence the standard SMD is split with one half on each side of the fault. Changes in orientation of the rocks are sensed and used to indicate stress across the fault 324.

In both applications the SMD output is fed through its associated electronics to the microprocessor which evaluates the data according to preprogrammed instructions and activates appropriate displays and/or alarm generators.

Structural Sonar System

According to this embodiment of the invention, SMD systems are provided which utilize the structure of an ocean-going vessel or submarine to passively or actively detect other objects or vessels.

The invention involves mounting SMDs on the structure of a vessel, configuring the shape of the vessel structure appropriately and using the combined SMD/Vessel structure as a super sensitive microphone for listening.

In the active mode of operation the system sends out pulses which reflect from other objects and detects the reflected pulses.

In the passive mode of operation the system listens for signals originating from other sources.

Figure 50A:
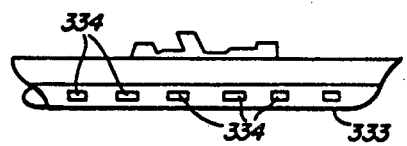
FIGS. 50a -c illustrates an embodiment of the invention used for sonar measurements.
Figure 50B:
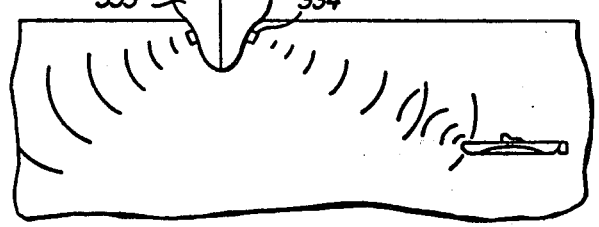
Figure 50C:
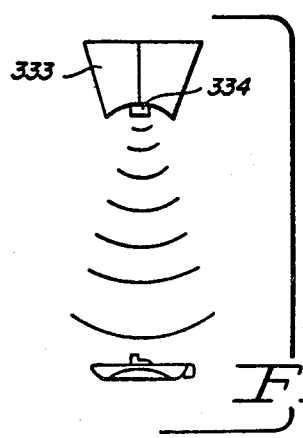

FIGS. 50 A, B, and C depict concepts for implementation of this embodiment. Essentially, the system uses the ship structure 333 as a very large antenna which, combined with the 0–40 kHz frequency range of the SMDs 334, results in improved range and detection capability in comparison with prior art sonar systems.

Vibration Detection and Location System

According to this embodiment, SMD systems are provided for detecting and locating unusual vibrations in aircraft and other vehicles such as automobiles.

This invention couples the unique sensitivity of the SMD measurements with sophisticated processing techniques to permit the determination of the precise location of unwanted (nuisance) rattles and vibrations.

The system consists of at least four (4) SMD sensors, their associated electronics, processing capability, and suitable displays. In one mode of operation the invention is permanently located in the vehicle. By sensing the vibration and evaluating the time of arrival of correlated vibrations at different sensors, the location can be determined. This is accomplished by the standard use of time of arrival and transmission velocity information. Basically, four independent measurements are required to solve four equations in four unknowns (3 spatial, 1 time).

Figure 51:
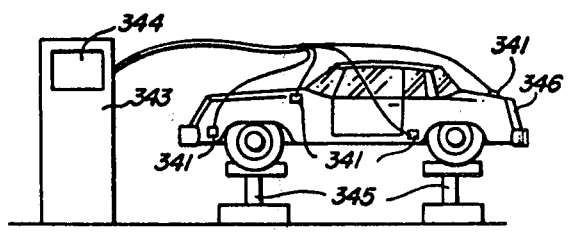
FIG. 51 depicts an embodiment of the invention which is used for vibration detection and location in vehicles such as automobiles.

In another mode of operation the system is maintained in a repair facility and the vehicle brought to the facility for test. In this mode each type vehicle is analyzed and sensor locations specified. This system is depicted in FIG. 51. The vehicle 346 is positioned on shakers 345. The four sensors 341 are mounted on the vehicle at prescribed locations. The sensor outputs are fed through the cable 342 to the microprocessor 343. The microprocessor solves for position of the offending rattle and displays 344 the coordinates of its location. With the location known, the vibration can be repaired.

Battlefield Force Detector

According to this embodiment of the invention, SMD systems are used for assessing movement and deployment of men and equipment under battlefield conditions.

The extreme sensitivity of the SMD provides a seismic detector and the invention incorporates such a detector into a system which is capable of providing information on type, number, location, and movement of enemy forces.

The SMD is mounted on a diaphragm and used as a geophone. The sensitivity of the SMD coupled with the variable design parameters (material, thickness, size, mounting technique) of the diaphragm produce a geophone of remarkable performance.

When suitably deployed, any motion near the sensor produces a characteristic vibration signature. The existence of the signal is used to indicate movement and the frequency content is analyzed to provide information about the source. Using triangulation techniques and/or proximity to various sensors, the location and direction of movement can be determined.

The system is capable of detecting and monitoring movement on the ground or in below-ground tunnels. Sensors can be hardwired to processing equipment or can be self-contained battery powered units which communicate optically or electronically with monitoring stations and/or aircraft.

Figure 52:
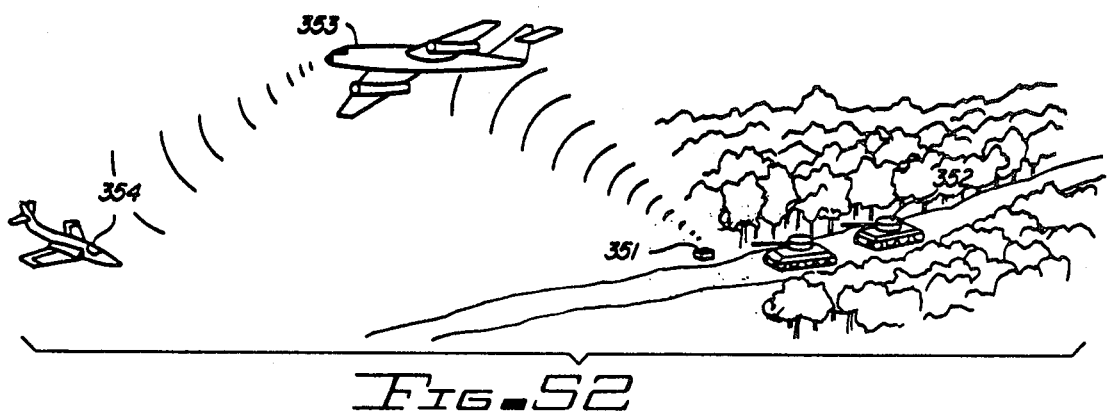
FIGS. 52-53 depict embodiments of the invention which are used for battlefield force detection.

FIG. 52 depicts one mode of application of this embodiment. The package 351 is deployed near a jungle trail. Enemy tanks 352 are detected. The information is radioed to the orbiting electronics aircraft 353 which calls in fighter aircraft 354 to strike the tanks.

Figure 53:
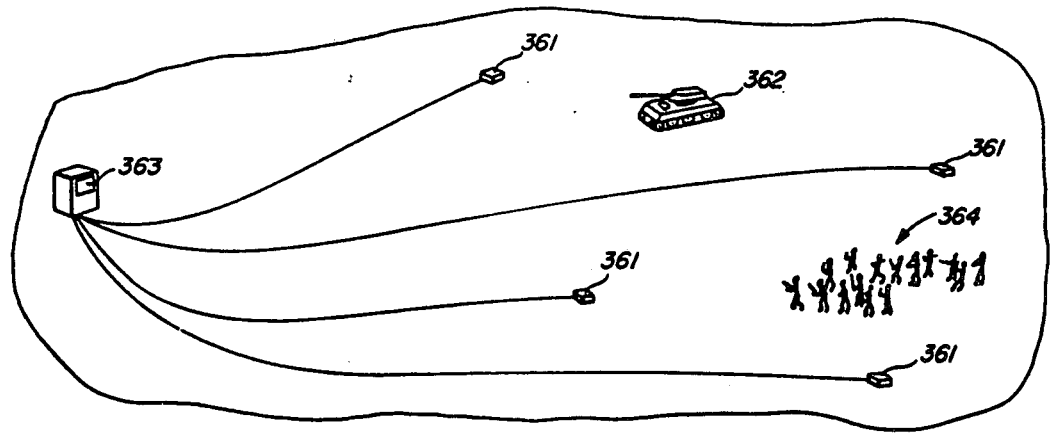

FIG. 53 depicts another mode of operation. Sensors 361 are deployed and are hardwired to the electronics, processing and display system 363. A tank 362 and a group of soldiers 364 are sensed and tracked. Frequency signatures permit discrimination of the tank and men.

Automatic Line Judge

In this embodiment of the invention, SMD systems are provided to automatically determine and signal when a game ball falls outside the playing area.

In sporting games, such as tennis, it is often difficult to determine where the ball hits the ground relative to an out-of-bounds line. Current practice involves the use of line judges in important matches and/or the players' best judgment in ordinary matches. No simple automatic system exists for performing the function.

Figure 54:
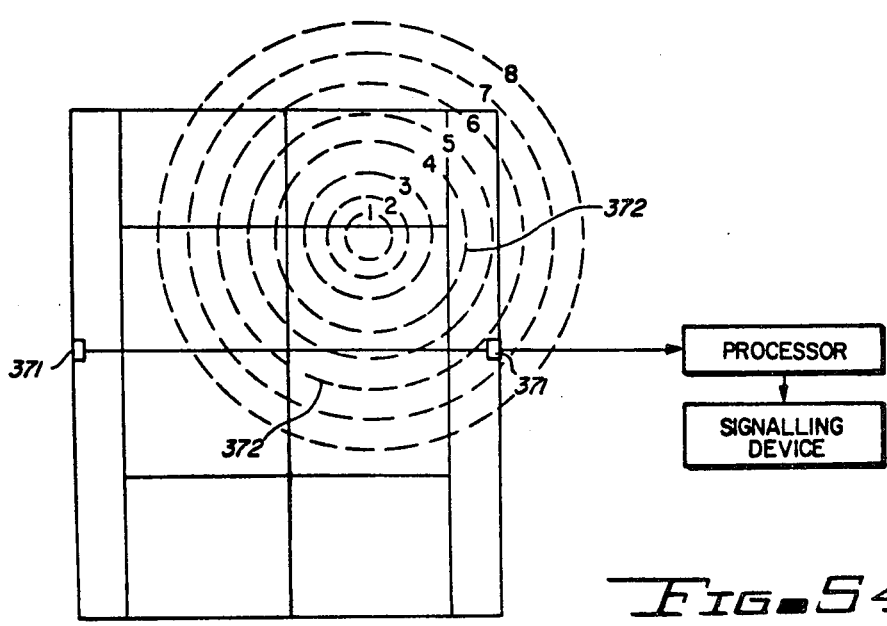
FIG. 54 illustrates an embodiment of the invention which is used as an automatic line judge.
Figure 55:
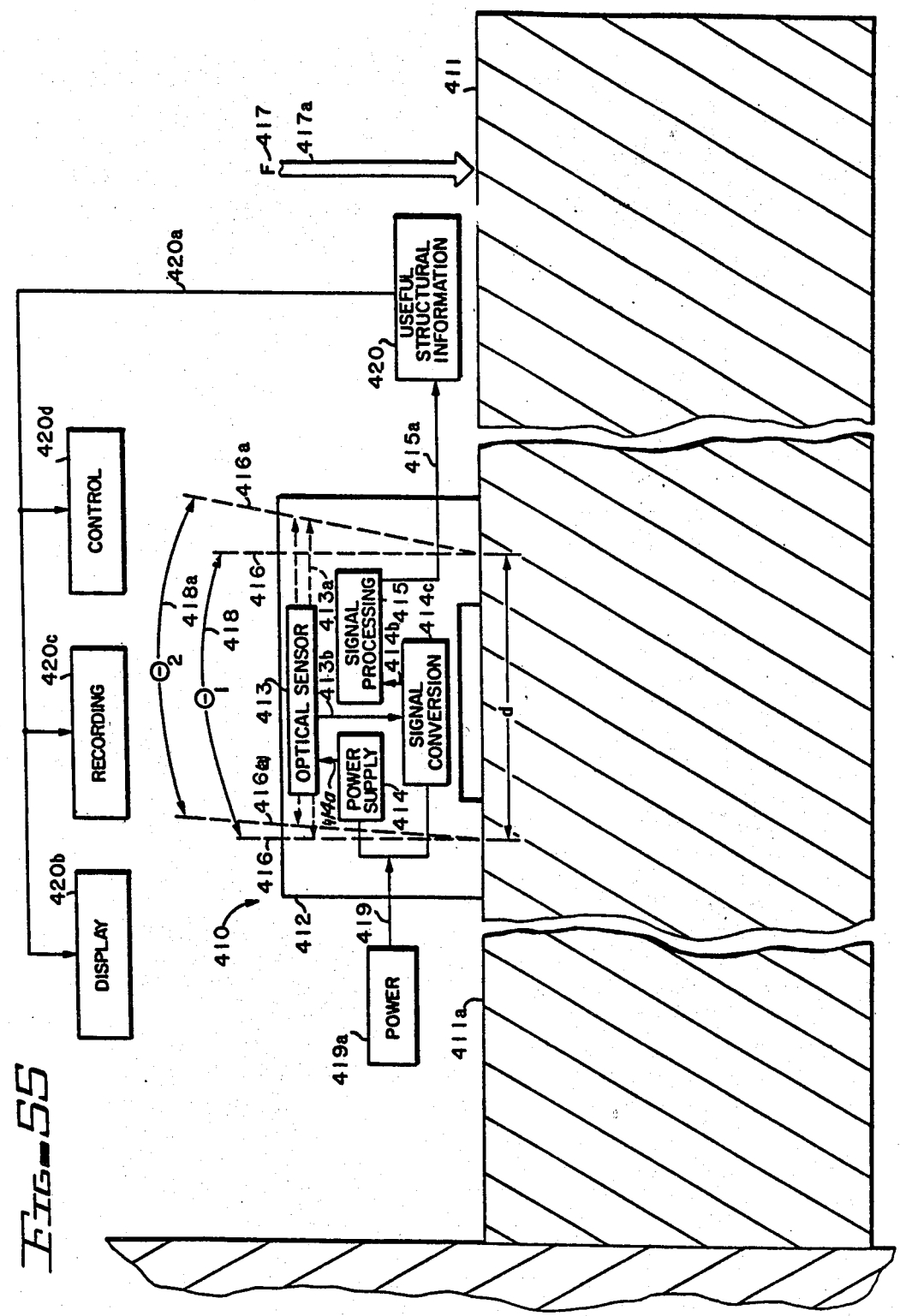
Figure 56:
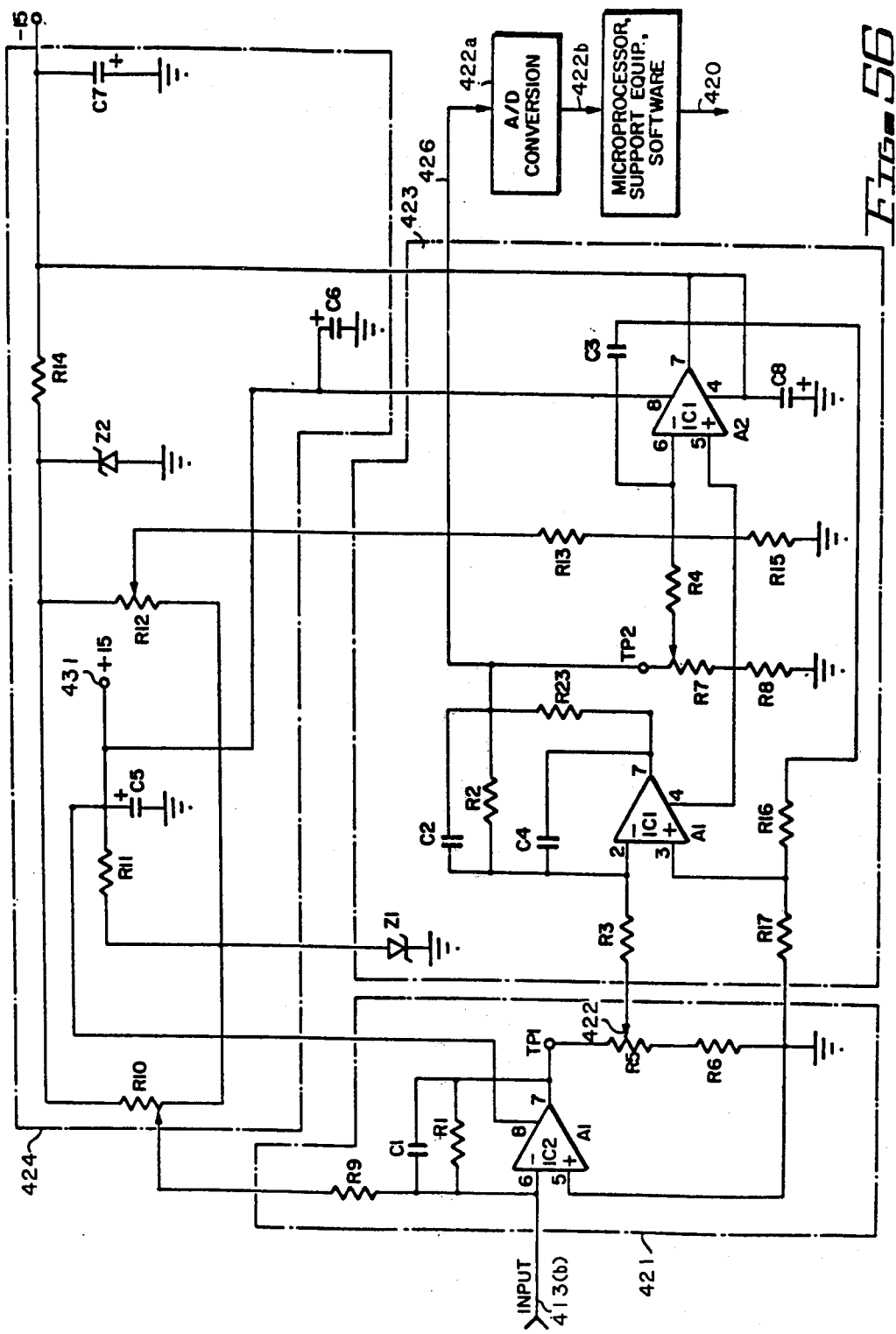
Figure 57:
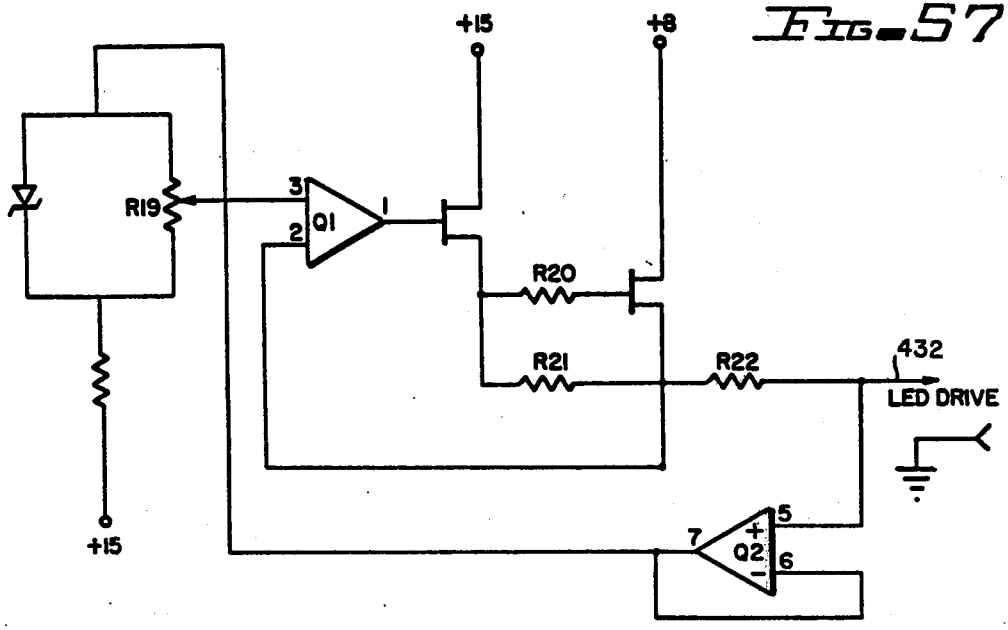
Figure 58:
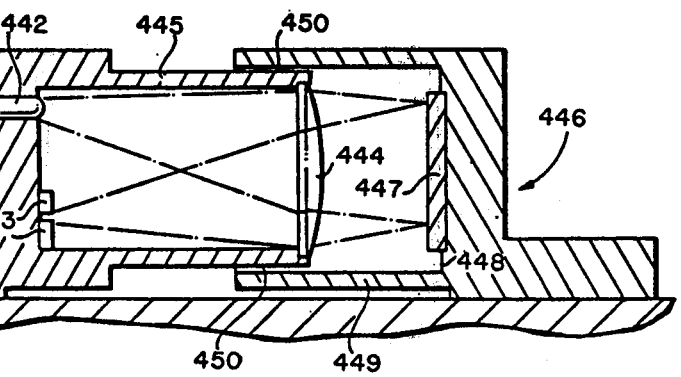

This invention uses the extreme sensitivity of the SMD and the rapid processing capability of a dedicated microprocessor to determine the location of a surface hit in the vicinity of the playing field. Using two SMDs 371 on a tennis court as shown in FIG. 54, the time of arrival of the seismic waves 372 generated when the ball strikes the surface provides sufficient information to determine location. Adaptive filtering and frequency discrimination techniques are used to eliminate footsteps and other background noise.

ADDITIONAL MISCELLANEOUS SYSTEMS

Contact Pickup for Musical Instruments

According to this embodiment of the invention, SID's (or SMD's with external signal and data-processing electronics) are used as contact pickups for musical instruments.

Figure 61:
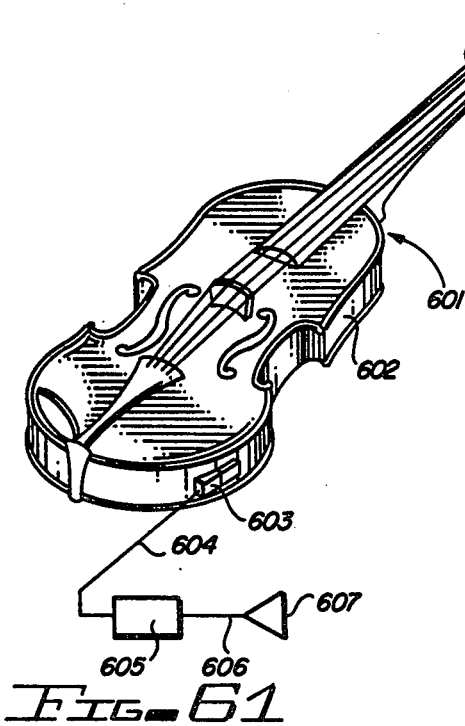
FIGS. 61 and 61A illustrate an embodiment of the invention which is used as a contact pickup for musical instruments.

For example, as illustrated in FIG. 61, a stringed instrument such as a violin 601 having a sound box 602 is provided with an SID 603 mounted on the interior surface of the sounding box 602. The output 604 of the SID 603 is fed to appropriate amplification and/or suitable signal-conditioning circuits 605, the output 606 of which is provided to a suitable speaker system 607.

Figure 61A:
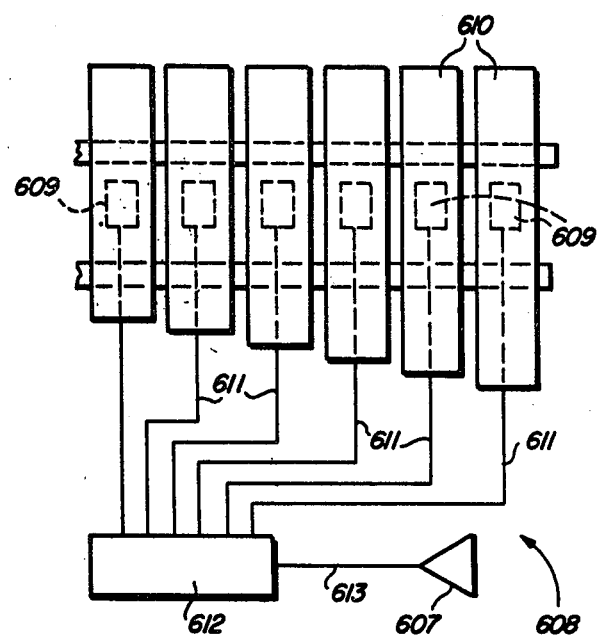

In the case of percussion instruments, such as drums or, as shown in FIG. 61A, a xylophone 608, the SID's 609 are mounted on the undersurface of the individual bars 610 and the outputs 611 are fed to appropriate amplification and/or signal-conditioning circuitry 612, the output 613 of which is fed to a speaker system 607.

Weight and Volume Measuring System

In this embodiment of the invention, SID's or SMD's with suitable external electronics are used in systems for measuring the weight and/or volume of bulk substances in tanks, bins or other containers, either fixed or mobile.

Figure 62:
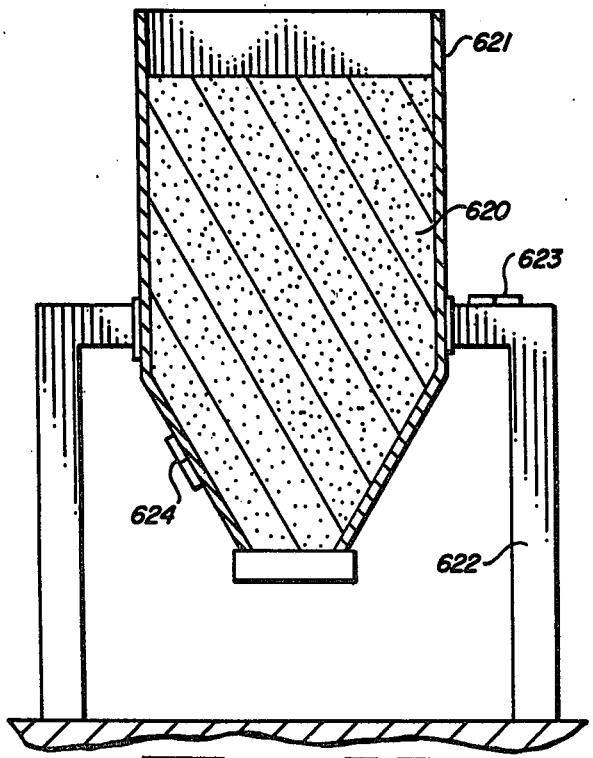
FIG. 62 illustrates an embodiment of the invention which is used for measuring weight and/or volume of bulk substances.

As depicted in FIG. 62, for example, the weight of a bulk substance 620 in a bin 621 is transferred to the walls of the bin 621 and to its supporting structure 622, causing deflections which can be sensed by SID's 623 mounted on the supporting structure 622 or SID's 624 mounted on the walls of the container 621. The output of the SID's 623 and/or 624 gives a direct measurement of the weight of the substance in the bin 621. Likewise, since the volume of the substance 620 is primarily a function of weight, density, void volume and moisture content, it is possible to calculate and directly indicate the volume of the material 620 in the bin 621. In some instances, the deflections of the walls of the bin 621 will depend on the depth or location of the material 620 therewithin. In such cases, the SID output can directly indicate the volume of the material 620.

Stranded Cable Strength and Strand Monitor

According to this embodiment of the invention, SID's and/or SMD's are used to monitor the tension in a stranded cable and the condition of the individual strands of the cable. For example, as illustrated in FIG. 63, an SID 631 is mounted on the cable bollard 632 of a barge 633 moored by means of a stranded cable 634 to a mooring 635 or an anchor (not shown). The breaking of a strand of the cable 634 releases energy which propagates as an accoustic pulse through the cable 634. This pulse causes a deflection of the surface of the bollard 632 which is detected by the SID 631. Thus, the SID monitors the number of strand breaks and that information is used to assess the remaining strength of the cable 634.

In addition, the tension in the cable 634 is directly transmitted to the bollard 632 and its deflection can be measured by the SID 631 to provide direct information concerning the tension in the cable 634.

Quality Control of Metal Formings and Other Unique Structures

According to this embodiment of the invention, SID's are employed in a system to provide quality control for metal formings and other unique structures. A metal forming or other unique structure has certain deflection characteristics for given loading conditions. If critical regions are defined and the deflections for a "perfect" sample are measured, calculated or defined, the SID can be used to measure the actual deflections. These can then be compared with the "perfect" values and an assessment made of the quality of the metal forming or other structure. Ranges of tolerance can be established and the quality of a batch of the formings or structures can thus be established and controlled.

Figure 64:
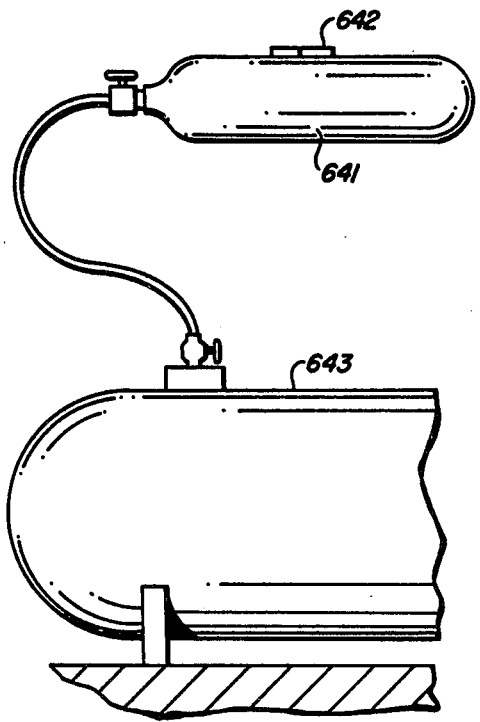

For example, as shown in FIG. 64, the deflection of the side walls of a pressure bottle 641 can be measured by an SID 642 attached to the exterior surface of the bottle 641. Thus, if the deflection of the wall of a bottle 641 which is known to be capable of withstanding a predetermined internal pressure, e.g., 300 psig, is measured by the SID 642, that deflection can be established as a "standard", against which the deflections of an entire batch of bottles 641 can be compared to determine whether they will withstand that pressure. As shown in FIG. 64, each bottle 641 is pressurized from a remote pressure source 643 and the deflection of the walls of the individual bottles 641 is measured by the SID 642 and compared to the known standard deflection.

In accordance with an alternate embodiment, as illustrated in FIG. 64A, a unique structure 644 is struck with a calibrated hammer 645. The vibrations of the structure 644 are sensed by the SID 646 and compared in appropriate data-processing components 647 with the known "standard" vibration signature, to determine whether the metal forming or structure 644 has been properly constructed and/or whether it has internal flaws.

Benchless Laser Alignment System

According to this embodiment of the invention, SMD's are used in systems for aligning the reflecting mirrors of a laser cavity so as to eliminate the need for a massive stabilization bench.

The reflecting mirrors of a laser cavity must remain precisely aligned if maximum power is to be achieved with the laser. The precision required is on the order of $10^{-6}$ radians. Since the SMD is capable of measuring angles as small as $10^{-9}$ radians, it can be used to sense small angular deviations in the mirror alignment and provide information to an active control system to null the deviation.

As shown in FIG. 65, a pair of laser mirrors 651 and 651a are mounted on movable mirror supports 652 and 652a, each of which is pivotally mounted on a suitable electrically controlled actuator mechanism 653 and 653a, which may be independently supported and which can tilt the mirror supports 652 and 652a as indicated by the arrows A to adjust the relative angular orientation of the mirrors 651 and 651a. The support 652 carries a light source (LED) 654 and photocells 655. The other mirror support 652a carries a concentrating lens 656 and a reflecting mirror 657. The SMD output 658 is fed to signal-conditioning electronics and microprocessor unit 659, the outputs 660 and 660a of which drive the control actuator 653 and 653a to null the output signal 658 and precisely align the mirrors 651 and 651a. The LED output frequency is selected to differ from the environmental light sources, such as the laser beam or ambient light. The photocells are selected to respond to the LED frequency and are appropriately shielded.

Havings described our invention in such clear and concise terms to enable those skilled in the art to understand and practice it, we claim:

1. A system for collecting and interpreting data reflecting the effect of at least a selected one of a plurality of forces acting on a structure, said system comprising, in combination:
   (a) at least one structural moment detector carried by said structure for generating the output signals in response to said plurality of forces acting on said structure, said structural moment detector being responsive to deflection of said structure by bending changes induced by said forces and being insensitive to linear distortions of said structure caused by said forces;
   (b) electronic circuit means for processing said output signals to modify the information content thereof, including rejecting components of said signals which reflect the effects of extraneous forces other than said selected one; and
   (c) means for manipulating said processed signals to provide secondary signals responsive to the condition of said structure as a result of the application of said selected force.

* * * * *